(12) United States Patent
Nishi

(10) Patent No.: US 8,416,656 B2
(45) Date of Patent: Apr. 9, 2013

(54) REPRODUCING METHOD AND REPRODUCING APPARATUS

(75) Inventor: Noriaki Nishi, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/459,357

(22) Filed: Apr. 30, 2012

(65) Prior Publication Data

US 2012/0294131 A1    Nov. 22, 2012

(30) Foreign Application Priority Data

May 20, 2011   (JP) .................................. 2011-113544

(51) Int. Cl.
*G11B 7/00*   (2006.01)

(52) U.S. Cl.
USPC ..................... 369/44.23; 369/44.37

(58) Field of Classification Search .................. None
See application file for complete search history.

(56) References Cited

U.S. PATENT DOCUMENTS

| | | | | |
|---|---|---|---|---|
| 5,416,766 A | * | 5/1995 | Horimai | 369/116 |
| 5,420,847 A | * | 5/1995 | Maeda et al. | 369/111 |
| 6,091,692 A | * | 7/2000 | Morimoto | 369/112.17 |
| 2001/0038592 A1 | * | 11/2001 | Kobayashi | 369/59.23 |
| 2002/0018420 A1 | * | 2/2002 | Nishi | 369/53.29 |
| 2006/0104173 A1 | * | 5/2006 | Shibuya et al. | 369/44.37 |
| 2007/0097834 A1 | * | 5/2007 | Sakai | 369/112.05 |
| 2009/0028021 A1 | * | 1/2009 | Yin et al. | 369/53.17 |
| 2009/0238048 A1 | * | 9/2009 | Feng et al. | 369/44.23 |
| 2009/0303850 A1 | * | 12/2009 | Nakai et al. | 369/53.15 |

FOREIGN PATENT DOCUMENTS

| | | |
|---|---|---|
| JP | 2005-332453 A | 12/2005 |
| JP | 4023365 B2 | 10/2007 |
| JP | 2010-225237 A | 10/2010 |
| JP | 2010-244672 A | 10/2010 |

* cited by examiner

*Primary Examiner* — Peter Vincent Agustin
(74) *Attorney, Agent, or Firm* — Wolf, Greenfield & Sacks, P.C.

(57) ABSTRACT

A reproducing method includes: irradiating a laser spot for servo to which astigmatism making up a generally 45-degree angle in the tangential direction of an information recording track has been applied, and one or more laser spots for reproduction, onto a recording medium where a track group is formed with multiple information recording tracks adjacent with a narrower track pitch than a track pitch equivalent to optical cut-off, and also where a track group pitch is wider than the track pitch equivalent to optical cut-off; and subjecting one or more laser spots for reproduction to on-track control as to one of the information recording tracks by taking a tangential push pull signal obtained from reflected light information of the laser spot for servo as a tracking error signal, and performing tracking servo control using this tracking error signal, and reproducing data from the reflected light information thereof.

6 Claims, 31 Drawing Sheets

DE-TRACK (360° IS TRACK GROUP CYCLE)

DE-TRACK (360° IS TRACK GROUP CYCLE)

FIG. 30A
FIG. 30B
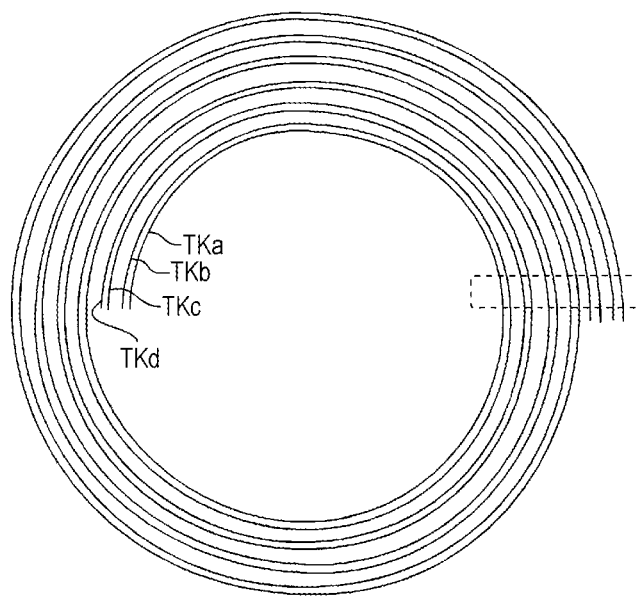
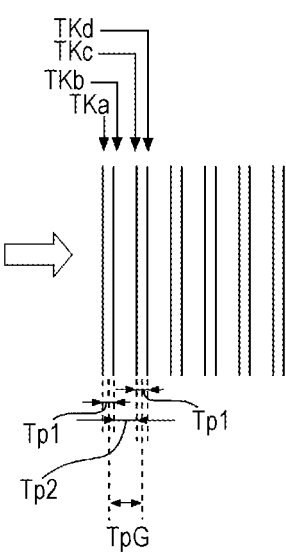

REPRODUCING METHOD AND REPRODUCING APPARATUS

BACKGROUND

The present disclosure relates to a reproducing method and a reproducing apparatus, and specifically relates to a technique for performing suitable reproduction as to a recording medium to which high-density recording has been made due to narrowing of track pitch.

Reproduction-only discs and recordable discs (write-once discs and rewritable discs) belonging to categories such as CD (Compact Disc), DVD (Digital Versatile Disc), Blu-ray Disc (registered trademark), and so forth have variously been developed.

With the field of such optical discs, further increase of capacity due to high-density recording has been demanded for next-generation discs.

SUMMARY

Examples which can be conceived for the directionality of high-density recording in disc-shaped recording media include increasing the number of recording layers, increasing recording density in track line direction, increasing recording density in track pitch direction (narrowing of track pitch), and further increasing recording capacity using signal processing such as data compression processing.

Of these, the present disclosure focuses on increasing recording density in track pitch direction. A laser spot is irradiated on an information recording track of an optical disc to reproduce data from reflected light information thereof. However, in this case, when the track pitch on the optical disc is narrower than a pitch equivalent to optical cut-off, good reflected light information is not obtained. In particular, information in the tracking direction is not obtained. This prevents a laser spot from being suitably traced on an information recording track by tracking servo control.

Accordingly, simple narrowing of track pitch is meaningless if reproduction is not suitably performed, since the recording/reproduction system will not work. Note that "pitch equivalent to optical cut-off" mentioned here means an inverse of optical cut-off space frequency, and "narrower than pitch equivalent to optical cut-off" mentioned here represents a state in which optical space frequency corresponding to a pitch thereof is higher than a cut-off space frequency.

The present disclosure provides a reproducing method and a reproducing apparatus whereby suitable tracking control can be realized, and data reproduction can be performed in the event of realizing high-density recording as a recoding medium having a narrower track pitch than a pitch equivalent to optical cut-off, as high-density recording due to narrowing of track pitch.

A reproducing method according to the present disclosure is a reproducing method as to a recording medium where a track group is formed with multiple information recording tracks being adjacent with a narrower track pitch than a track pitch equivalent to optical cut-off stipulated with the wavelength of a laser beam to be irradiated, and NA (numerical aperture) of an irradiation optical system, and also a track group pitch from a perspective of the track group unit is arranged to be wider than a track pitch equivalent to the optical cut-off. A laser spot for servo to which astigmatism making up an angle of generally 45 degrees as to the tangential direction of an information recording track has been applied, and one or more laser spots for reproduction are then irradiated thereupon, at least one or more laser spots for reproduction are subjected to on-track control as to one of information recording tracks to reproduce data from reflected light information thereof by taking a tangential push pull signal obtained from reflected light information of the laser spot for servo as a tracking error signal, and performing tracking servo control using this tracking error signal.

A reproducing apparatus according to the present disclosure includes: an optical head configured to irradiate a laser spot for servo to which astigmatism making up an angle of generally 45 degrees as to the tangential direction of an information recording track has been applied, and one or more laser spots for reproduction to a recording medium where a track group is formed with multiple information recording tracks being adjacent with a narrower track pitch than a track pitch equivalent to optical cut-off stipulated by the wavelength of a laser beam to be irradiated, and NA of an irradiation optical system, and also a track group pitch from a perspective of the track group unit is arranged to be wider than the track pitch equivalent to optical cut-off, via an objective lens to obtain reflected light information according to each laser spot; a servo circuit unit configured to cause the optical head to execute a tracking operation for having at least one or more laser spots for reproduction on-track as to one of the information recording tracks by taking a tangential push pull signal obtained from reflected light information of the laser spot for servo as a tracking error signal, and performing tracking servo control using this tracking error signal; and a reproducing circuit unit configured to reproduce data from the reflected light information of a laser spot for reproduction on-track-controlled as to an information recording track.

Also, the reproducing apparatus according to the present disclosure may include a crosstalk cancel unit configured to perform crosstalk cancel processing regarding the reflected light information of a laser spot for reproduction on-track-controlled as to an information recording track; with the reproducing circuit unit reproducing data from reflected light information subjected to crosstalk cancel processing at the crosstalk cancel unit.

With such a technique according to the present disclosure, the recording medium is configured so that a track group is formed with multiple tracks being adjacent with a narrower track pitch than a track pitch equivalent to optical cut-off, and further, a track group pitch between adjacent track groups is arranged to be wider than a track pitch equivalent to optical cut-off. That is to say, the track pitch is narrowed within a track group, and high-density in the track pitch direction is realized as a whole.

Note that "track group pitch" mentioned here is a pitch in the case of a track group formed of multiple tracks being assumed as one track. That is to say, this is a pitch between the center location in the radial direction from a perspective of the entire track group, and the same center location of an adjacent track group.

In this case, track groups are arranged to have a wider pitch than optical cut-off, and accordingly, a signal used for tracking servo is obtained from the cyclical configuration of the track groups. Specifically, a laser spot for servo to which astigmatism making up an angle of generally 45 degrees as to the tangential direction of an information recording track has been applied is irradiated on a track group having the track group pitch, whereby a tracking error signal can be generated as a tangential push pull signal obtained from reflected light information thereof.

According to the present disclosure, reproduction can be performed by suitably applying tracking servo to a recording medium with high-density recording being realized by forming information recording tracks with a narrower track pitch than a track pitch equivalent to optical cut-off. Thus, a high-density recording/reproduction system can be realized.

BRIEF DESCRIPTION OF THE DRAWINGS

FIGS. 30A and 30B are explanatory diagrams of a modification of the track configuration of an information recording track according to an embodiment.

DETAILED DESCRIPTION OF EMBODIMENTS

Figure 1A:
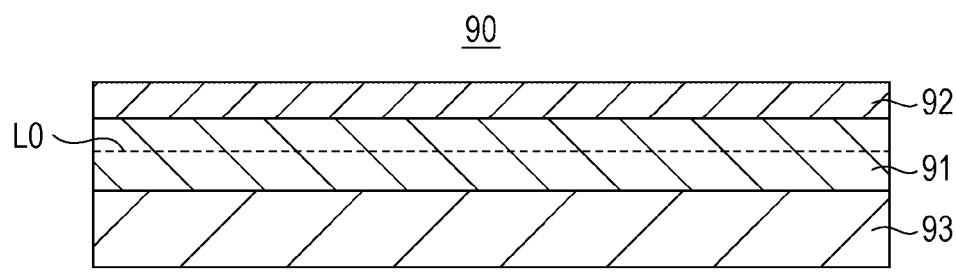
FIGS. 1A through 1C are explanatory diagrams of a configuration example of a recording medium according to an embodiment of the present disclosure.
Figure 1B:
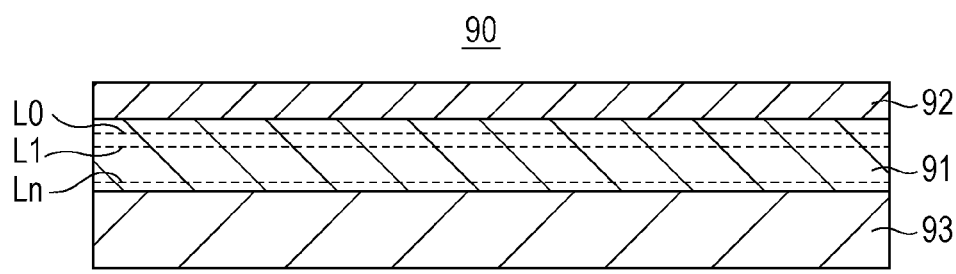
Figure 1C:
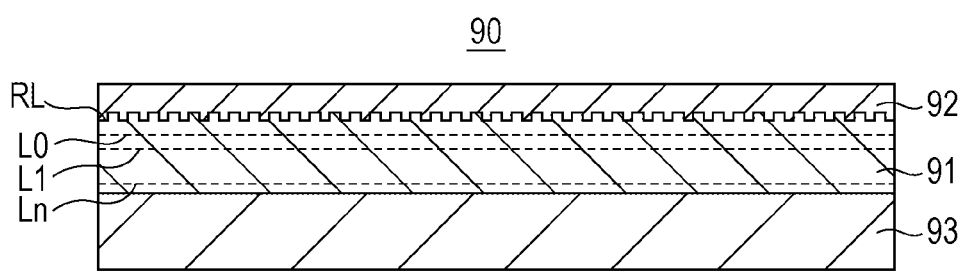

An embodiment of the present disclosure will be described below in accordance with the following sequence.
1. Recording Medium According to Embodiment
2. Configuration Example of Disc Drive Apparatus
3. Recording/Reproduction System
4. High-Density Due to Narrow Track Pitch
5. Tracking Technique
6. Optical System Configuration Example
7. Modifications 1. Recording Medium According to Embodiment Let us say that a recording medium according to the present embodiment is, for example, an optical disc with a 12-cm diameter, for example, such as a CD, DVD, Blu-ray Disc (BD) (registered trademark), or the like. FIGS. 1A through 1C schematically illustrate a cross-sectional configuration example of a recording medium (optical disc) 90 according to the present embodiment.

FIG. 1A illustrates a configuration example wherein the optical disc 90 includes a substrate 93, a bulk layer 91, and a cover layer 92. A recording layer (layer L0) is formed in a predetermined depth location within the bulk layer 91. Note that "depth" mentioned here is distance from the surface of the cover layer 92 as viewed from the thickness direction. The configuration in FIG. 1A is an example of a single layer disc of which the recording layer is a single layer. The surface side of the cover layer 92 serves as an incident surface of a laser beam. A laser beam is input from the surface side of the cover layer 92, and focused on the layer L0 to form a spot, and recording or reproduction is performed.

FIG. 1B illustrates an example of a multi-layer disc where a great number of recording layers (layers L0 through Ln) in the bulk layer. In this case, a laser beam is input from the surface side of the cover layer 92, focused on a layer to be processed to form a spot, and recording or reproduction is performed.

FIG. 1C is an example wherein a reference surface RL is provided. The reference surface RL is formed on a joint surface portion between the bulk layer 91 and the cover layer 92, for example. This reference surface RL has a land/groove configuration. For example, the groove is formed in a spiral shape, and serves as a tracking guide at the time of recording of information recording tracks to be formed in the layers L0 through Ln within the bulk layer 91.

Note that the reference surface RL may be a pit row instead of the groove. Also, an arrangement may be made wherein the groove or pit row is subjected to wobbling (meandering) based on address information, and absolute location information is recorded.

The examples in FIGS. 1A through 1C are but examples. An example other than these configurations can be conceived as the layer configuration of the optical disc 90 according to the present embodiment. In the case of a single layer, the bulk layer 91 such as FIG. 1A does not necessarily have to be provided. For example, an arrangement may be made wherein the cover layer 92 is formed on the substrate 93, and the layer L0 is formed on the joint surface between the substrate 93 and the cover layer 92. Also, in the case of a multi-layer disc of a multi-layer such as FIG. 1B or 1C, an arrangement may be made wherein the bulk layer 91 is configured of a layered film configuration, and the layers L0 through Ln are formed in the layered films respectively.

Note that, hereafter, when collectively naming the layer L0 in the case of a single layer as the recording layer, and the layers L0 through Ln of a multi-layer, "layer L" will be represented.

A reproduction-only disc or recordable disc (write once disc or rewritable disc) are assumed as the optical disc 90 according to the present embodiment. In the case of a reproduction-only disc, an embossed pit row is formed on the layers L. The embossed pit row may be formed by stamping using a stamper formed of the master disc for the layers L.

In the case of the optical disc 90 serving as a recordable disc, laser beam irradiation for recording is performed in a state rotated and driven by a recording apparatus, and a mark row according to recorded information is formed on the layers L. As for the mark, there can be conceived a phase change mark, a dye change mark, an interference pattern mark, a void (hole) mark, a refractive index change mark, and so forth.

At the time of reproduction as to the optical disc 90, a laser beam for reproduction is irradiated on the layer L to be reproduced in a state in which the optical disc 90 is rotated and driven by a reproducing apparatus. Reflected light information corresponding to the pit row or mark row formed in the layer L thereof is detected, and data is reproduced.

Here, the optical disc 90 according to the present embodiment realizes large capacity by performing high-density recording using narrowing of track pitch of an information recording track formed by the mark row (or embossed pit row) in the layer L.

Figure 2A:
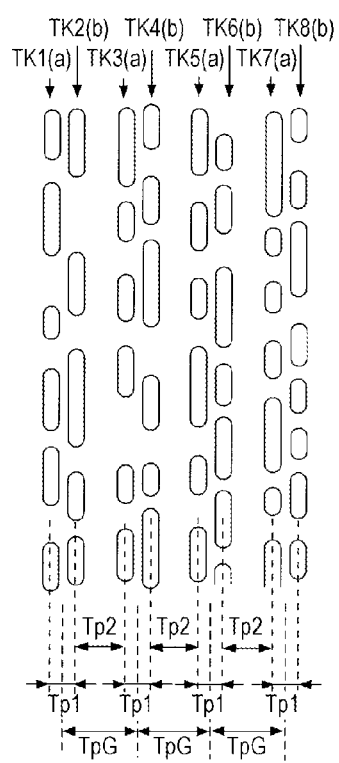
FIGS. 2A and 2B are explanatory diagrams of a track configuration of a double spiral according to an embodiment.
Figure 2B:
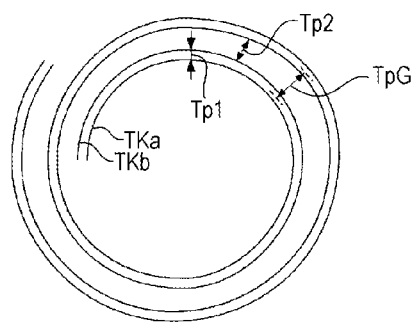

FIGS. 2A, 2B, 3A, 3B, 4A, and 4B illustrate an example of information recording tracks. FIGS. 2A and 2B illustrate an example wherein a track is formed with a double spiral configuration. Note that "information recording track" mentioned here is a track configuration formed with a continuous mark row (or embossed pit row) in a spiral shape, and when simply "track" is mentioned, this specifies one round of a track portion.

FIG. 2A schematically illustrates an information recording track formed with a mark row (or embossed pit row; hereafter, description will be made with an example of a mark row) in the layer L. Also, FIG. 2B schematically illustrates a track path when viewing an information recording track formed with a mark row in the disc plane direction. As illustrated in FIG. 2B, the information recording track has a double spiral configuration wherein two independent track paths TKa and TKb are each formed in a spiral shape.

FIG. 2A is a diagram of adjacent eight tracks (TK1 through TK8) in the radial direction in this information recording track having a double spiral configuration being enlarged. Note that, though the tracks TK1 through TK8 are added have (a) or (b) appended at the end, the tracks TK1, TK3, TK5, and TK7 appended with (a) indicate tracks on a track path TKa, and the tracks TK2, TK4, TK6, and TK8 appended with (b) indicate tracks on a track path TKb.

This information recording track forms a track group with two adjacent tracks of a track on the track path TKa and a track on the track path TKb. For example, the tracks TK1 and TK2 make up a track group, and the tracks TK3 and TK4 make up a track group.

"Track group" mentioned here is a set of adjacent tracks adjacent with a track pitch Tp1. "Track pitch Tp1" mentioned here is a first track pitch narrower than a track pitch equivalent to optical cut-off stipulated by the wavelength of a laser beam to be irradiated, and NA (numerical aperture) of an irradiation optical system. For example, between the tracks TK1 and TK2 has a narrower track pitch Tp1 than that which is equivalent to optical cut-off.

Also, tracks adjacent with adjacent track groups are separated with a track pitch Tp2. The track pitch Tp2 is a second track pitch wider than a track pitch equivalent to optical cut-off, for example. For example, between the tracks TK2 and TK3, or between the tracks TK4 and TK5, or the like become tracks adjacent between adjacent track groups, and the pitch of theses is the track pitch Tp2.

The pitch between track groups is indicated as a track group pitch TpG. In the event that the track pitch Tp2 is a wider track pitch than a track pitch equivalent to optical cut-off, the track group pitch TpG has to be wider than a track pitch equivalent to optical cut-off. Specifically, with the information recording track in FIGS. 2A and 2B, a track group of two tracks adjacent with the track pitch Tp1 narrower than a track pitch equivalent to optical cut-off is formed, and also the track group pitch TpG of adjacent track groups is wider than a track pitch equivalent to optical cut-off.

The information recording track has a double spiral configuration with two independent track paths TKa and TKb as illustrated in FIG. 2B being each formed in a spiral shape, and the track group of the track pitch Tp1 narrower than a track pitch equivalent to optical cut-off are formed with the track paths TKa and TKb. Also, the track group pitch TpG between the track groups revolved and adjacent by the double spiral configuration is wider than a track pitch equivalent to optical cut-off.

While the track pitches Tp1 and TpG will be described later in detail, with tracks adjacent with the track pitch Tp1 narrower than that which is equivalent to optical cut-off, an RF signal, a SUM signal, a push pull signal, and so forth are not suitably obtained as reflected light information at the time of laser irradiation.

With the present embodiment, a track group made up of multiple tracks adjacent with such a track pitch Tp1 has a cyclical configuration that is the track group pitch TpG wider than that which is equivalent to optical cut-off, whereby a signal capable of tracking control can be extracted.

Note that the track pitch Tp2 may be narrower than that which is equivalent to optical cut-off. That is to say, it is consistently desirable that the track group pitch TpG is wider than a pitch equivalent to optical cut-off. For example, in the case of this double spiral configuration, the track group pitch TpG=Tp1+Tp2 holds. Accordingly, even if both of the track pitches Tp1 and Tp2 are narrower than that which is equivalent to optical cut-off, it is desirable that Tp1+Tp2 is wider than that which is equivalent to optical cut-off. In the event of reducing the track pitch Tp2 so as to be narrower than that which is equivalent to optical cut-off, this is advantageous in that high density can be achieved correspondingly. On the other hand, in the event that the track pitch Tp2 is wider than that which is equivalent to optical cut-off, this is advantageous for extraction of a tracking error signal TE, crosstalk at the time of reproduction, or cross-writing at the time of recording.

As for the information recording track of the optical disc 90 according to the present embodiment, a more multiple spiral configuration other than the double spiral configuration in FIGS. 2A and 2B may be employed such as a triple spiral configuration, a quadruple spiral configuration, and so forth.

Figure 3A:
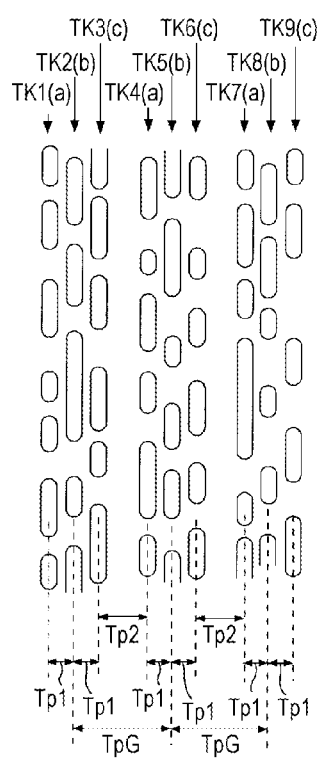
FIGS. 3A and 3B are explanatory diagrams of a track configuration of a triple spiral according to an embodiment.
Figure 3B:
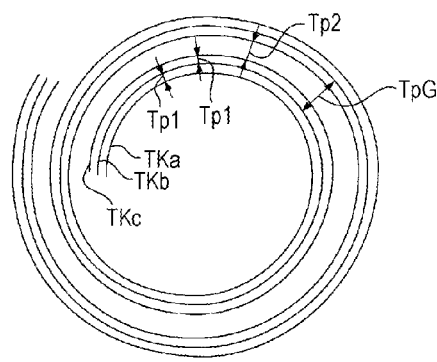

FIGS. 3A and 3B schematically illustrate the configuration of an information recording track in the same format as with FIGS. 2A and 2B. As illustrated in FIG. 3B, the information recording track has a triple spiral configuration wherein three independent track paths TKa, TKb, and TKc are each formed in a spiral shape.

FIG. 3A is a diagram of adjacent nine tracks (TK1 through TK9) in the radial direction in this information recording track having a triple spiral configuration being enlarged. Note that the suffixes (a), (b), and (c) of the tracks TK1 through TK9 indicate the track paths TKa, TKb, and TKc in which the tracks thereof are included, respectively.

This information recording track forms a track group with three adjacent tracks of a track on the track path TKa, a track on the track path TKb, and a track on the track path TKc. For example, the tracks TK1, TK2, and TK3 make up a track group, and the tracks TK4, TK5, and TK6 make up a track group. Tracks within a track group are adjacent with the track pitch Tp1. Further, adjacent track groups are separated with a track group pitch TpG.

Specifically, with the information recording track in FIGS. 3A and 3B, a track group is formed of three tracks adjacent with the track pitch Tp1 narrower than a track pitch equivalent to optical cut-off, and also, the track group pitch TpG between adjacent track groups is wider than a track pitch equivalent to optical cut-off.

The information recording track has a triple spiral configuration with three independent track paths TKa, TKb, and TKc as illustrated in FIG. 3B being each formed in a spiral shape, and the track group with the track pitch Tp1 are formed with the track paths TKa, TKb, and TKc. Also, the track group pitch TpG between the track groups revolved and adjacent by the triple spiral configuration is wider than a track pitch equivalent to optical cut-off. In the case of this triple spiral configuration, the track group pitch TpG=Tp1+Tp2+Tp1 holds.

Accordingly, in the event that the track pitch Tp2 between tracks (e.g., tracks TK3 and TK4) to be adjacent between adjacent track groups is set wider than a track pitch equivalent to optical cut-off, the track group pitch TpG is consequently wider than a track pitch equivalent to optical cut-off. It goes without saying that the track pitch Tp2 may be narrower than a track pitch equivalent to optical cut-off.

Figure 4A:
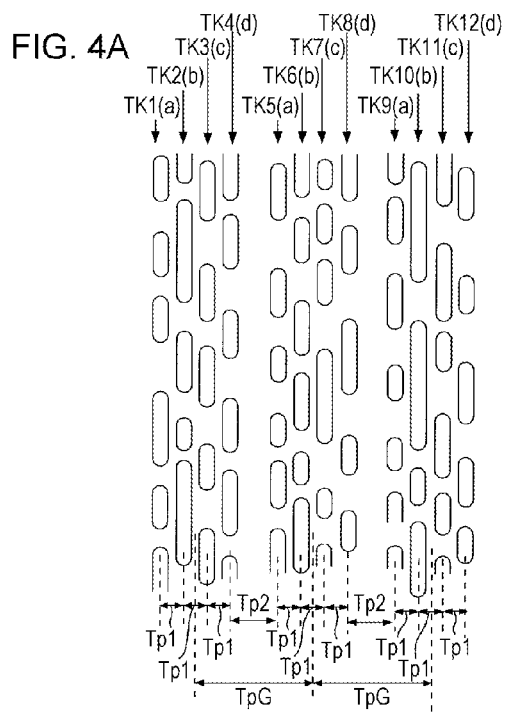
FIGS. 4A and 4B are explanatory diagrams of a track configuration of a quadruple spiral according to an embodiment.
Figure 4B:
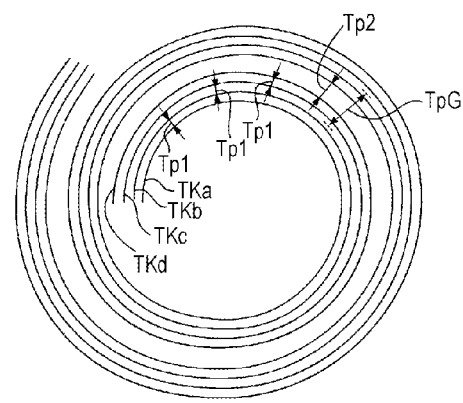

FIGS. 4A and 4B schematically illustrate the configuration of an information recording track in the same format as with FIGS. 2A and 2B. As illustrated in FIG. 4B, the information recording track has a quadruple spiral configuration wherein four independent track paths TKa, TKb, TKc, and TKd are each formed in a spiral shape.

FIG. 4A is a diagram of adjacent twelve tracks (TK1 through TK12) in the radial direction in this information recording track having a quadruple spiral configuration being enlarged. Note that the suffixes (a), (b), (c), and (d) of the tracks TK1 through TK12 indicate the track paths TKa, TKb, TKc, and TKd in which the tracks thereof are included, respectively.

This information recording track forms a track group with four adjacent tracks of a track on the track path TKa, a track on the track path TKb, and a track on the track path TKc, and a track on the track path TKd. For example, the tracks TK1, TK2, TK3, and TK4 make up a track group, and the tracks TK5, TK6, TK7, and TK8 make up a track group. Tracks within a track group are adjacent with the track pitch Tp1. Further, adjacent track groups are separated with a track group pitch TpG.

Specifically, with the information recording track in FIGS. 4A and 4B, a track group is formed of four tracks adjacent with the track pitch Tp1 narrower than a track pitch equivalent to optical cut-off, and also, the track group pitch TpG between adjacent track groups is wider than a track pitch equivalent to optical cut-off.

The information recording track has a quadruple spiral configuration with four independent track paths TKa, TKb, TKc, and TKd as illustrated in FIG. 4B being each formed in a spiral shape, and the track group with the track pitch Tp1 are formed with the track paths TKa, TKb, TKc, and TKd. Also, the track group pitch TpG between the track groups revolved and adjacent by the quadruple spiral configuration is wider than a track pitch equivalent to optical cut-off.

In the case of this quadruple spiral configuration, the track group pitch TpG=Tp1+Tp1+Tp1+Tp2 holds. Accordingly, in the event that the track pitch Tp2 between tracks (e.g., tracks TK4 and TK5) to be adjacent between adjacent track groups is set wider than a track pitch equivalent to optical cut-off, the track group pitch TpG is consequently wider than a track pitch equivalent to optical cut-off. It goes without saying that the track pitch Tp2 may be narrower than a track pitch equivalent to optical cut-off.

While the examples of the double spiral configuration, triple spiral configuration, and quadruple spiral configuration have been described so far, a multiple spiral configuration equal to or greater than a five-fold spiral configuration can be conceived in the same way.

2. Configuration Example of Disc Drive Apparatus

The configuration of the disc drive apparatus (recording/reproduction apparatus) according to the present embodiment will be described with reference to FIG. 5. Let us say that the disc drive apparatus according an embodiment can perform reproduction or recording by handling a reproduction-only disc or a recordable disc (write once disc or rewritable disc) serving as the disc 90 according to the present embodiment having an information recording track configuration such as described above.

Upon the optical disc 90 according to the present embodiment being mounted on the disc drive apparatus, the optical disc 90 is loaded on an unshown turn table, and rotated or driven at a constant linear velocity (CLV) or constant angular velocity (CAV) by a spindle motor 2 at the time of a recording/reproduction operation.

At the time of reproduction, readout of mark information (or embossed pit information) recorded in the information recording track on the optical disc 90 is performed by an optical pickup (optical head) 1. Also, at the time of recording of data as to the optical disc 90, user data is recorded in a track on the optical disc 90 as a mark row by the optical pickup 1.

A laser diode serving as a laser beam source, a photo detector for detecting reflected light, an objective lens serving as an output edge of a laser beam, an optical system which irradiates a laser beam on the disc recording surface via the objective lens, or guides reflected light thereof into the photo detector, and so forth are formed within the optical pickup 1.

The objective lens is held so as to move in the tracking direction and focus direction by a biaxial mechanism within the optical pickup 1. Also, the entire optical pickup 1 is configured so as to move in the disc radial direction by a thread mechanism 3. Also, the laser diode in the optical pickup 1 is driven to emit a laser beam by a laser driving 13 sending a driving current thereinto.

The reflected light information from the disc 90 is detected by the photo detector, and is converted into an electric signal according to the received light amount, and supplied to a matrix circuit 4. The matrix circuit 4 includes a current voltage conversion circuit, a matrix computation/amplifier circuit, and so forth corresponding to the output current from multiple light receiving elements serving as photo detectors, and generates a signal to be used using matrix computation processing. For example, the matrix circuit 4 generates a reproduction information signal (RF signal) equivalent to data to be reproduced, a focus error signal for servo control, a tracking error signal, and so forth.

The reproduction information signal output from the matrix circuit 4 is supplied to a data detection processing unit 5 via a crosstalk cancel circuit 6. Also, the focus error signal and tracking error signal output from the matrix circuit 4 are supplied to an optical block servo circuit 11.

The crosstalk cancel circuit 6 performs crosstalk cancel processing as to an RF signal. The optical disc 90 according to the present embodiment has tracks adjacent with the very narrow track pitch Tp1 as illustrated in FIGS. 2A, 2B, 3A, 3B, 4A, and 4B. The narrower the track pitch is, the more mixing of crosstalk components of an adjacent track increases at the time of reproduction. Therefore, the crosstalk cancel circuit 6 is provided, thereby enabling processing for canceling the RF signal components of an adjacent track.

Note that the crosstalk cancel circuit 6 may not be provided depending on the format (track pitch and so forth) of the information recording tracks on the optical disc 90. Also, the crosstalk cancel circuit 6 may control the operation of the matrix circuit for generating a tracking error signal.

The data detection processing unit 5 performs binarization processing of a reproduction information signal. For example, the data detection processing unit 5 performs A/D conversion processing of an RF signal, reproduction clock generation processing using a PLL, PR (Partial Response) equalization processing, Viterbi decoding (maximum likelihood decoding), and so forth, and obtains a binary data row using partial response maximum likelihood decoding processing (PRML detection system: Partial Response Maximum Likelihood detection system). The data detection processing unit 5 then supplies the binary data row serving as the information read out from the optical disc 90 to an encoding/decoding unit 7 on the subsequent stage.

The encoding/decoding unit 7 performs demodulation of data to be reproduced at the time of reproduction, and modulation processing of data to be recorded at the time of recording. Specifically, the encoding/decoding unit 7 performs data demodulation, deinterleaving, ECC decoding, address decoding, and so forth at the time of reproduction, and performs ECC encoding, interleave, data modulation, and so forth at the time of recording.

At the time of reproduction, the binary data row decoded at the data detection processing unit 5 is supplied to the encoding/decoding unit 7. The encoding/decoding unit 7 performs demodulation processing as to the binary data row to obtain the data to be reproduced from the optical disc 90.

For example, in the event that the data recorded in the optical disc 90 is data subjected to run length limited code modulation such as RLL(1, 7) PP modulation (RLL; Run Length Limited, PP: Parity preserve/Prohibit rmtr (repeated minimum transition runlength)) or the like, the encoding/decoding unit 7 performs demodulation processing as to such data modulation, and also performs error correction using ECC decoding processing, and obtains the data to be reproduced from the optical disc 90.

The data decoded to the data to be reproduced at the encoding/decoding unit 7 is transferred a host interface 8, and transferred to a host device 100 based on the instructions of a system controller 10. The host device 100 mentioned here is a computer device or AV (Audio-visual) system device, for example.

Though the data to be recorded is transferred from the host device 100 at the time of recording, the data to be recorded thereof is supplied to the encoding/decoding unit 7 via the host interface 8. In this case, the encoding/decoding unit 7 performs error correction code addition (ECC encoding), interleave, sub code addition, and so forth as encoding processing of the data to be recorded. Also, the encoding/decoding unit 7 subjects the data subjected to these processes to run length limited code modulation such as RLL(1-7) PP system, or the like.

The data to be recorded processed at the encoding/decoding unit 7 is supplied to a write strategy unit 14. The write strategy unit 14 performs laser driving pulse waveform adjustment as to the properties of a recording layer, the spot shape of a laser beam, a recording linear velocity, and so forth as recording compensation processing, and then outputs a laser driving pulse to a laser driver 13.

The laser driver 13 feeds a current to a laser diode within the optical pickup 1 based on the laser driving pulse subjected to the recording compensation processing, and executes driving of laser emission. Thus, the mark according to the data to be recorded is formed on the optical disc 90. Note that the laser driver 13 includes a so-called APC (Auto Power Control) circuit, and performs control so as to have constant laser output without depending on temperature or the like while monitoring laser output power according to output of a detector for monitoring of laser power provided into the optical pickup 1.

The target values of laser output at the time of recording and at the time of reproduction are provided from the system controller 10, and control is performed so that the laser output levels at the time of recording and at the time of reproduction become the target values thereof.

The optical block servo circuit 11 generates various servo drive signals of focus, tracking, and thread from the focus error signal and tracking error signal from the matrix circuit 4 to execute a servo operation. Specifically, the optical block servo circuit 11 generates a focus drive signal and a tracking drive signal according to the focus error signal and tracking error signal to drive a focus coil and a tracking coil of the biaxial mechanism within the optical pickup 1 using the biaxial driver 18. Thus, a tracking servo loop and a focus servo loop according to the optical pickup 1, matrix circuit 4, optical block servo circuit 11, biaxial driver 18, and biaxial mechanism are formed.

Also, the optical block servo circuit 11 turns off the tracking servo loop according to the track jump command from the system controller 10, and outputs a jump drive signal, thereby executing a track jump operation.

Also, the optical block servo circuit 11 generates a thread drive signal based on the thread error signal obtained as the low-frequency components of the tracking error signal, and access execution control from the system controller 10, and so forth, and drives the thread mechanism 3 using the thread driver 19. The thread mechanism 3 includes a mechanism configured of a main shaft, a thread motor, a propagation gear, and so forth, which holds the optical pickup 1 though not illustrated in the drawing, and drives the thread motor according to the thread drive signal, thereby performing slide movement of the optical pickup 1 which has to be performed.

The spindle servo circuit 12 performs control for performing CLV rotation of the spindle motor 2. The spindle servo circuit 12 obtains a clock and so forth generated in PLL processing as to an RF signal as the rotation velocity information of the current spindle motor 2, and compares this with predetermined CLV (or CAV) reference velocity information, thereby generating a spindle error signal.

The spindle servo circuit 12 outputs the spindle drive signal generated according to the spindle error signal, and causes the spindle driver 17 to execute CLV rotation or CAV rotation of the spindle motor 2. Also, the spindle servo circuit 12 generates a spindle drive signal according to the spindle kick/brake control signal from the system controller 10, and executes an operation of the spindle motor 2 such as activation, stop, acceleration, slowdown, or the like.

Note that, with the spindle motor 2, for example, an FG (Frequency Generator) or PG (Pulse Generator) is provided, and output thereof is supplied to the system controller 10. Thus, the system controller 10 can recognize the rotation information (rotation velocity, rotation angular location) of the spindle motor 2.

Various operations of a servo system and a recording/reproduction system as described above are controlled by the system controller 10 formed of a microcomputer. The system controller 10 executes various types of processing according to the command from the host device 100 to be provided via the host interface 8.

For example, in the event that a write command has been output from the host device 100, the system controller 10 first moves the optical pickup 1 to a logical or physical spatial address to be written. The system controller 10 then causes the encoding/decoding unit 7 to execute encoding processing regarding the data (e.g., video data, audio data, etc.) transferred from the host device 100 as described above. Recording is then executed by the laser driver 13 being driven to emit a laser beam according to the data encoded as described above.

Also, for example, in the event that a read command for requesting transfer of certain data recorded in the optical disc 90 has been supplied from the host device 100, the system controller 10 first performs seek operation control with the specified address as an object. Specifically, the system controller 10 outputs a command to the optical block servo circuit 11 to execute an access operation of the optical pickup 1 with the address specified by the seek command as a target.

Thereafter, the system controller 10 performs operation control for transferring the data of the specified data section to the host device 100. Specifically, the system controller 10 performs readout of data from the disc 90, causes the data detection processing unit 5 and encoding/decoding unit 7 to execute reproduction processing, and transfers the requested data.

Figure 5:
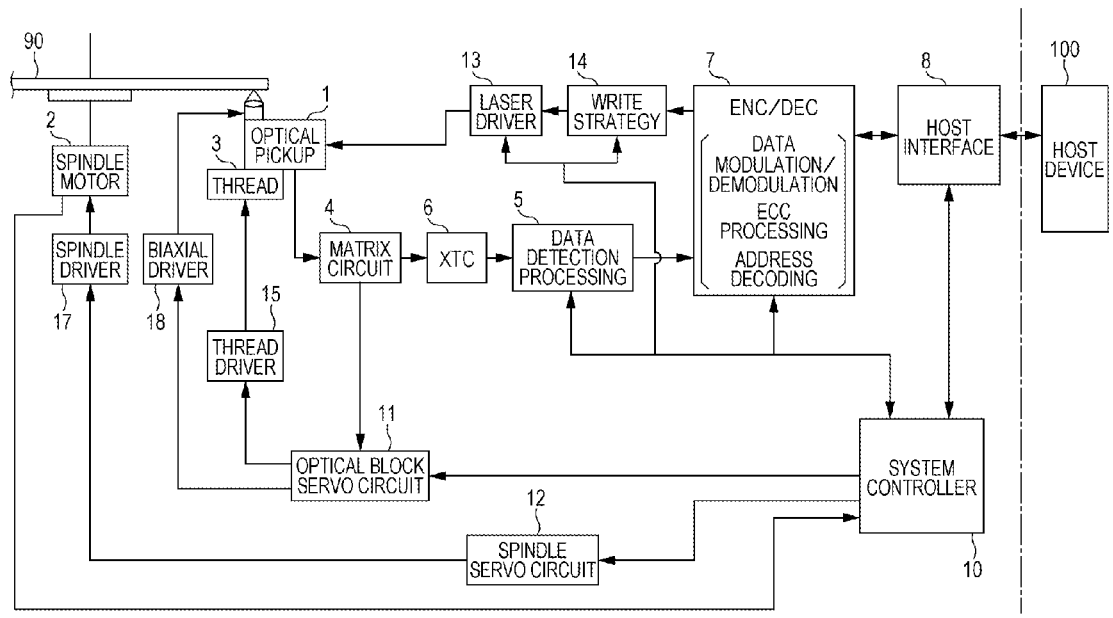
FIG. 5 is a block diagram of a disc drive apparatus according to an embodiment.

Note that, though the example in FIG. 5 has been described as the disc drive apparatus to be connected to the host device 100, there may be a mode wherein the disc drive apparatus is not connected to another device. In this case, the configuration of a data input/output interface portion will differ from FIG. 5 such that an operating unit or display unit is provided. Specifically, recording or reproduction is performed according to a user's operation, and also a terminal unit for inputting/outputting various types of data has to be formed. It goes without saying that various configuration examples of the disc drive apparatus can also be conceived.

3. Recording/Reproduction System

Figure 6A:
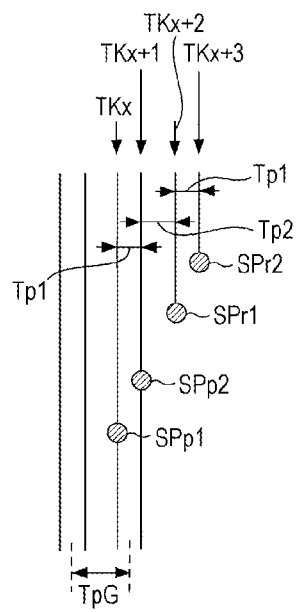
FIGS. 6A through 6C are explanatory diagrams of a recording/reproduction system example according to two reproduction spots+a recording spot according to an embodiment.
Figure 6B:
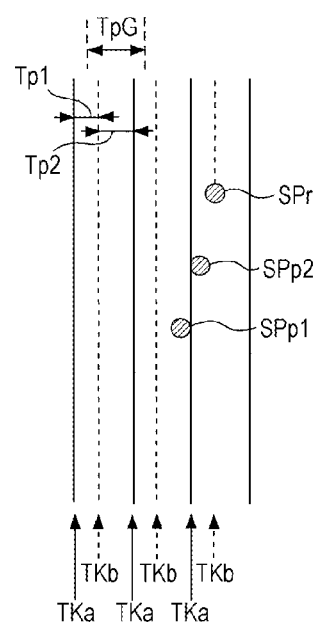
Figure 6C:
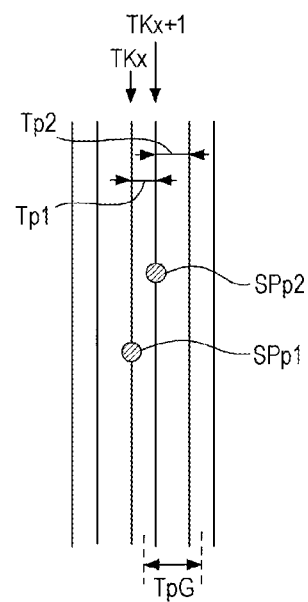

Various examples serving as a recording/reproduction system according to the present embodiment will be described. FIGS. 6A through 6C illustrate a recording operation example and a reproduction operation example in the case that information recording tracks are configured to have a double spiral configuration as illustrated in FIGS. 2A and 2B. The drawings illustrate the information recording tracks using a solid line or dashed line.

FIG. 6A is an example wherein the optical pickup 1 irradiates two laser spots SPp1 and SPp2 for reproduction using a reproduction power laser, and two laser spots SPr1 and SPr2 for recording using a recording power laser on the layer L of the optical disc 90. Especially, this example is an example wherein the double spiral track paths are simultaneously formed.

Let us say that the laser spots SPp1 and SPp2 for reproduction are laser beams for servo used for detecting a tracking error signal. Tracking control is performed so as to have the laser spots SPp1 and SPp2 for reproduction trace a track group of the double spiral tracks TKx and TKx+1. For example, tracking control is arranged to be performed in the center of the tracks TKx and TKx+1.

Note that, though the track pitch Tp1 between the tracks TKx and TKx+1 is a narrower track pitch than that which is equivalent to optical cut-off, a tracking error signal can be obtained as a difference signal of the radial contrast signals obtained from the reflected light information of the two laser spots SPp1 and SPp2 for reproduction. This will be described later.

In this case, the optical pickup 1 irradiates the laser spots SPr1 and SPr2 for recording in a state mutually separated in the disc radial direction by the track pitch Tp1. Also, the optical pickup 1 irradiates the laser spot SPp2 for reproduction and the laser spot SPr1 for recording in a state separated in the disc radial direction by the track pitch Tp2.

Thus, while performing tracking control as to the track group (tracks TKx and TKx+1) on the inner circumference side, the tracks TKx+2 and TKx+3 on the outer circumference side can be recorded with the track group pitch TpG along the tracks TKx and TKx+1 thereof using the laser spots SPr1 and SPr2 for recording. Also, the double spiral track paths are simultaneously formed, whereby recording with a high transfer rate can be realized.

Note that such a recording operation is an operation wherein while performing tracking control as to tracks on the inner circumference side using the laser spots for reproduction, recording is performed using the laser spots for recording on the outer circumference side thereof. Such a tracking servo system will be referred to as "adjacent tracking servo" for description.

In the event of performing this adjacent tracking servo, first, there has to be a first round track. As illustrated in FIG. 1C, in the event that a reference surface RL is provided, a group or the like of the reference surface RL can be used, the first round double spiral tracks have to be formed by taking the group or the like of the reference surface RL thereof as a guide. As for the second round and thereafter, recording can be executed with the adjacent tracking servo as illustrated in FIG. 6A.

Figure 9A:
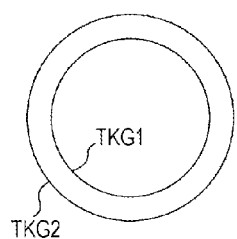
FIGS. 9A through 9F are explanatory diagrams of an example of a recording procedure according to an embodiment.

On the other hand, in the event that there is no reference surface RL as illustrated in FIGS. 1A and 1B, an operation example as illustrated in FIGS. 9A through 9D can be conceived. First, as illustrated in FIG. 9A, guide tracks TKG1 and TKG2 made up of one round complete circle are recorded on the layer L of the optical disc 90. These can be formed by the optical pickup 1 rotating the optical disc 90 one round while fixing laser spot locations. Specifically, first, the guide track TKG1 is formed, and the guide track TKG1 is then subjected to the adjacent tracking servo to form the guide track TKG2. At this time, the interval (track pitch) between the concentric circle guide tracks TKG1 and TKG2 has to be equal to the track group pitch TpG.

After recording the guide tracks TKG1 and TKG2 in this way, a jump pulse is learned such as a track jump from the guide track TKG1 to the TKG2 makes up just one rotation. Specifically, this jump pulse is a jump pulse forming a path illustrated with a dashed line in FIG. 9B.

Figure 9B:
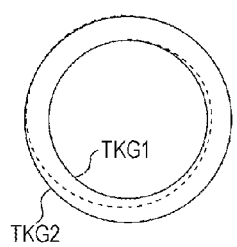
Figure 9C:
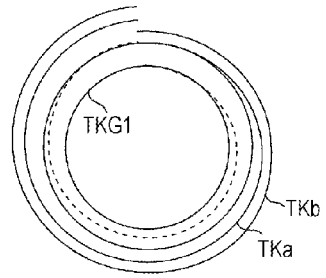
Figure 9D:
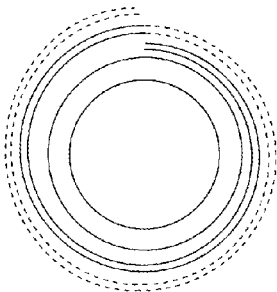

The first round double spiral tracks are then recorded using the learned jump pulse as illustrated in FIG. 9C. In the event of employing the learned jump pulse, with the first round of the double spiral tracks TKa and TKb, the laser spots SPr1 and SPr2 for recording gradually shift to the outer circumference side for each angular location. That is to say, one round worth of track in a double spiral shape can be formed. As for the second round and thereafter, double spiral tracks can be recorded using the adjacent tracking servo described in FIG. 6A as illustrated with a dashed line in FIG. 9D.

Next, FIG. 6B is an example wherein the optical pickup 1 irradiates the two laser spots SPp1 and SPp2 for reproduction using a reproduction power laser, and the one laser spot SPr for recording using a recording power laser on the layer L of the optical disc 90 to separately form the double-spiral track paths.

First, as illustrated with a solid line, a state is assumed wherein the track of the track path TKa has already been recorded in a spiral shape. Note that the track of this track path TKa is recorded so as to have a track pitch of Tp1+Tp2 in this case. In a state in which the track of this track path TKa exists, the track of the track path TKb illustrated with a dashed line is recorded.

In this case, the laser spots SPp1 and SPp2 for reproduction are subjected to tracking control as to the track of the track path TKa of the solid line. For example, tracking control is performed so that the middle of the laser spots SPp1 and SPp2 for reproduction is located in the track of the track path TKa. The laser spot SPr for recording is irradiated in a state separated from the track of the track path TKa in the disc radial direction by the track pitch Tp1.

Thus, the track of the track path TKb forming a double spiral adjacent to the track path TKa is recorded. As a result, there can be performed data recording using the information recording tracks as illustrated in FIGS. 2A and 2B having a double spiral, the track pitches Tp1 and Tp2, and the track group pitch TpG.

Note that, though this recording operation also performs the adjacent tracking servo as described above, in this case, the track of the track path TKa with a track pitch of Tp1+Tp2 is recorded before forming double spiral tracks.

Figure 9E:
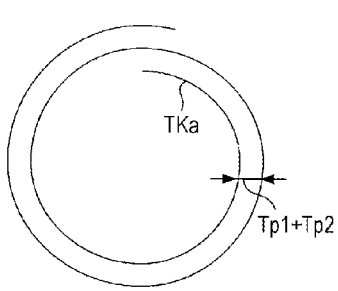
Figure 9F:
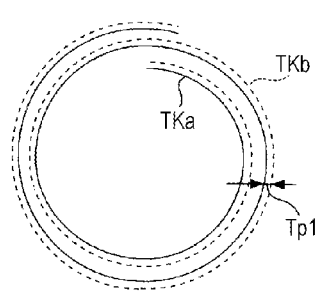

As illustrated in FIG. 1C, in the event that the reference surface RL is provided, and a group or the like of the reference surface RL can be used, the spiral track of the track path TKa with the track pitch of Tp1+Tp2 is formed as illustrated in FIG. 9E by taking the group or the like of the reference surface RL thereof as a guide. Thereafter, recording of the spiral track of the track path TKb can be executed as illustrated in the dashed line in FIG. 9F by performing the adjacent tracking servo as illustrated in FIG. 6B.

On the other hand, in the event that there is no reference surface RL as illustrated in FIGS. 1A and 1B, first as illustrated in FIG. 9A, the guide tracks TKG1 and TKG2 making up a round circle are recorded in the layer L of the optical disc 90.

After recording the guide tracks TKG1 and TKG2 in this way, a jump pulse is learned such as a track jump from the guide track TKG1 to the TKG2 makes up just one rotation, as illustrated in FIG. 9B. The first round single spiral track of the track path TKa is then recorded using the learned jump pulse.

Thereafter, as for the second round and thereafter, a spiral track as the track path TKa can be formed as illustrated in FIG. 9E by forming the tracks with the track pitch Tp1+Tp2 using the adjacent tracking servo. Thereafter, recording of the spiral track of the track path TKb can be executed as illustrated in the dashed line in FIG. 9F by performing the adjacent tracking servo as illustrated in FIG. 6B.

Next, a reproduction operation will be described with reference to FIG. 6C. This is a reproduction operation example in the case that an information recording track having a double spiral configuration such as FIGS. 2A and 2B has been formed with a recording operation (or reproduction-only disc) such as FIG. 6A or FIG. 6B.

In this case, the optical pickup 1 irradiates the two laser spots SPp1 and SPp2 for reproduction using a reproduction power laser on the layer L of the optical disc 90. The optical pickup 1 irradiates the laser spots SPp1 and SPp2 for reproduction in a state mutually separated in the disc radial direction by the track pitch Tp1. The laser spots SPp1 and SPp2 for reproduction are arranged to be on-track as to the tracks TKx and TKx+1 with the track pitch Tp1, respectively.

Though the track pitch Tp1 is a narrower track pitch than that which is equivalent to optical cut-off, a tracking error signal can be obtained as a difference signal of the radial contrast signals obtained from the reflected light information of the two laser spots SPp1 and SPp2 for reproduction. According to tracking servo control using this tracking error signal, the laser spots SPp1 and SPp2 for reproduction are on-track as to the tracks TKx and TKx+1, respectively. The data of the tracks TKx and TKx+1 can be reproduced from the reflected light information of the laser spots SPp1 and SPp2 for reproduction. Also, double-spiral track paths are simultaneously reproduced, whereby reproducing with a high transfer rate can be realized.

Next, description will be made regarding a recording operation example and a reproduction operation example in the case of the information recording track is configured as a double spiral configuration as illustrated in FIGS. 2A and 2B, with reference to FIGS. 7A through 7D. This example is an example wherein the optical pickup 1 irradiates a laser spot to which astigmatism making up an angle of generally 45 degrees in the tangential direction of the information recording track has been applied, as a laser spot SPp45 for servo.

Figure 7A:
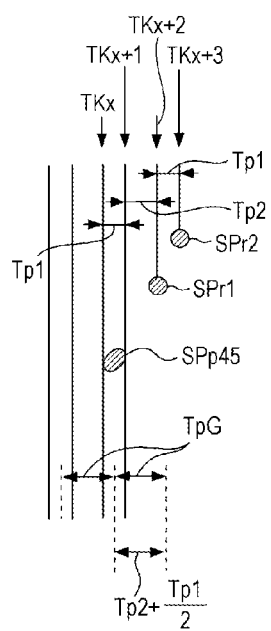
FIGS. 7A through 7D are explanatory diagrams of a recording/reproduction system example according to an astigmatic spot+a recording (reproduction) spot according to an embodiment.

First, FIG. 7A is an example wherein the optical pickup 1 irradiates the laser spot SPp45 for servo using a reproduction power laser, and two laser spots SPr1 and SPr2 for reproduction using a recording power laser on the layer L of the optical disc 90. Especially, this example illustrates an example wherein double spiral track paths are simultaneously formed.

Tracking control is performed so as to have the laser spots SPp45 for servo trace a track group of the double spiral tracks TKx and TKx+1. For example, tracking control is arranged to be performed in the center of the tracks TKx and TKx+1.

Note that, though the track pitch Tp1 between the tracks TKx and TKx+1 is a narrower track pitch than that which is equivalent to optical cut-off, a laser beam to which astigmatism has been applied is irradiated as the laser spot SPp45 for servo, whereby a tracking error signal can be obtained as a tangential push pull signal (a difference signal of the photo diodes divided in the vertical direction as to the track line direction) serving as reflected light information thereof. This will be described later.

In this case, the optical pickup 1 irradiates the laser spots SPr1 and SPr2 for recording in a state mutually separated in the disc radial direction by the track pitch TP1. Also, the optical pickup 1 irradiates the laser spot SPp45 for servo and the laser spot SPr1 for recording in a state separated in the disc radial direction by a track pitch Tp2+(Tp1/2).

Thus, while performing tracking control as to the tracks TKx and TKx+1 on the inner circumference side, the tracks TKx+2 and TKx+3 on the outer circumference side can be recorded along the tracks TKx and TKx+1 thereof using the laser spots SPr1 and SPr2 for recording. As a result, the information recording track of a double spiral configuration having the track pitches Tp1 and Tp2, and the track group pitch TpG such as FIGS. 2A and 2B is formed. In this case, double spiral track paths are simultaneously formed, recording with a high transfer rate can be realized.

Note that, at the time of recording of at least the first round track group for executing such adjacent tracking servo, recording using the reference surface RL, the recording operation described in FIGS. 9A through 9D, and so forth may be performed.

Figure 7B:
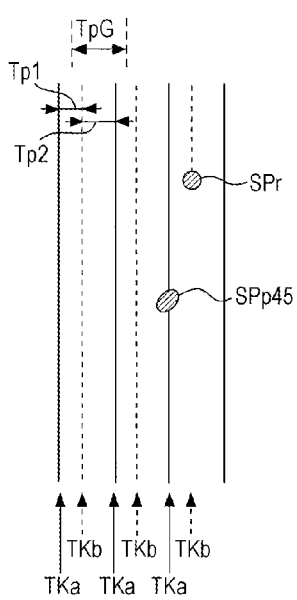

Next, FIG. 7B is an example wherein the optical pickup 1 irradiates the laser spot SPp45 for servo using a reproduction power laser, and the one laser spot SPr for recording using a recording power laser on the layer L of the optical disc 90 to separately form the double spiral track paths.

First, as illustrated with a solid line, let us assume a state in which the track of the track path TKa has already been recorded in a spiral shape. Note that, in this case, the track of the track path TKa records so that the track pitch becomes Tp1+Tp2 (which equals TpG). In a state in which the track of the track path TKa exists, the track of the track path TKb indicated by a dashed line is recorded. In this case, tracking control is performed so that the laser spot SPp45 for servo is on-track as to the track of the track path TKa in the solid line.

The laser spot SPr for recording is then irradiated in a state separated from the track of the track path TKa in the disc radial direction by the track pitch Tp1. Thus, the track of the track path TKb forming a double spiral adjacent to the track path TKa is recorded.

As a result, there can be performed data recording using the information recording tracks as illustrated in FIGS. 2A and 2B having a double spiral, the track pitches Tp1 and Tp2, and the track group pitch TpG. Note that, at the time of recording the track of the track path TKa serving as one spiral track, recording using the reference surface RL, the recording operation described in FIGS. 9A, 9B, 9E, and 9F, or the like may be performed.

Next, a reproduction operation will be described with reference to FIG. 7C. This is a reproduction operation example in the case that the information recording track having a double spiral configuration as illustrated in FIGS. 2A and 2B have been formed by a recording operation (or reproduction-only disc) such as FIG. 7A or FIG. 7B.

In this case, the optical pickup 1 irradiates the laser spot SPp45 for servo using a reproduction power laser, and the two laser spots SPp1 and SPp2 for reproduction on the layer L of the optical disc 90. In particular, tracking control is performed so as to have the laser spot SPp45 for servo trace the track group of the tracks TKx and TKx+1. For example, tracking control is arranged to be performed in the center of the tracks TKx and TKx+1.

The laser spots SPp1 and SPp2 for reproduction are irradiated so as to be each separated in the radial direction by the track pitch Tp1, and also the laser spot SPp1 for reproduction is irradiated so as to be separated from the laser spot SPp45 for servo by Tp2+(Tp1/2) as viewed in the radial direction.

In this state, the laser spots SPp1 and SPp2 for reproduction are on-track to the tracks TKx+2 and TKx+3 by the adjacent tracking servo using a tangential push pull signal serving as the reflected light information of the laser spot SPp45 for servo. Thus, the data of the tracks TKx+2 and TKx+3 can be reproduced from the reflected light information of the laser spots SPp1 and SPp2 for reproduction.

Figure 7C:
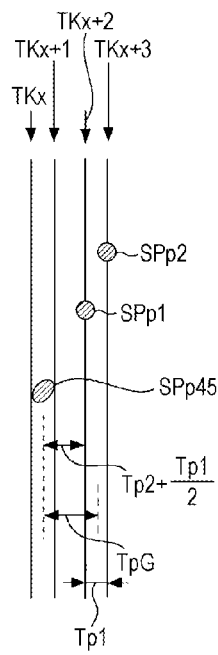
Figure 7D:
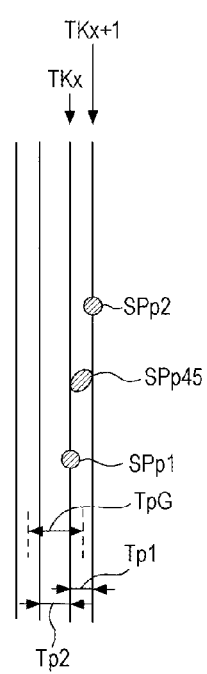

Note that, as illustrated in FIG. 7D, when the laser spot SPp45 for servo traces the center of the tracks TKx and TKx+1, the data of the tracks TKx and TKx+1 can also be reproduced from the reflected light information of the laser spots SP1 and SP2 for reproduction so that the laser spots SP1 and SP2 for reproduction are on-track as to the tracks TKx and TKx+1 respectively. In either case of FIGS. 7C and 7D as well, double spiral track obits are simultaneously reproduced, whereby high transfer rating can be realized.

Next, description will be made regarding a recording operation example and a reproduction operation example in the case that the information recording track has a triple spiral configuration as illustrated in FIGS. 3A and 3B, with reference to FIGS. 8A through 8C.

Figure 8A:
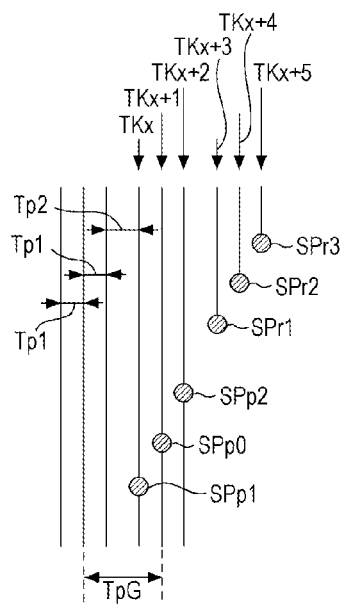
FIGS. 8A through 8C are explanatory diagrams of a recording/reproduction system example according to three reproduction spots+a recording spot according to an embodiment.

FIG. 8A is an example wherein the optical pickup 1 irradiates three laser spots SPp1, SPp2, and SPp0 for reproduction using a reproduction power laser, and three laser spots SPr1, SPr2, and SPr3 for recording using a recording power laser on the layer L of the optical disc 90. In particular, this is an example wherein triple spiral track paths are simultaneously formed.

Let us say that the laser spots SPp1, SPp0, and SPp2 for reproduction are laser beams for servo for detecting a tracking error signal. Tracking control is performed so as to have the laser spots SPp1, SPp0, and SPp2 for reproduction trace the track group of the triple spiral tracks TKx, TKx+1, and TKx+2.

Note that, though the track pitch Tp1 between the tracks TKx, TKx+1, and TKx+2 is a narrower track pitch than that which is equivalent to optical cut-off, a tracking error signal can be obtained as a difference signal of the radial contrast signals obtained from the reflected light information of the two laser spots SPp1 and SPp2 for reproduction of the three. This will be described later.

In this case, the optical pickup 1 irradiates the laser spots SPr1, SPr2, and SPr3 for recording in a state mutually separated in the disc radial direction by the track pitch Tp1. Also, the optical pickup 1 irradiates the laser spot SPp2 for reproduction and the laser spot SPr1 for recording in a state separated in the disc radial direction by the track pitch Tp2.

Thus, while performing tracking control as to the track group (tracks TKx, TKx+1, and TKx+2) on the inner circumference side, the tracks TKx+3, TKx+4, and TKx+5 on the outer circumference side can be recorded along the track group thereof using the laser spots SPr1, SPr2, and SPr3 for recording. That is to say, while forming the tracks of the track pitch Tp1 narrower than that which is equivalent to optical cut-off, the track group of the track group pitch TpG wider than that which is equivalent to optical cut-off can be formed. Also, the triple spiral track paths are simultaneously formed, whereby recording with a high transfer rate can be realized.

Note that, at the time of recording of at least first round track group used for performing such adjacent tracking servo, recording using the reference surface RL, the recording operation described in FIGS. 9A through 9D, or the like may be performed.

Figure 8B:
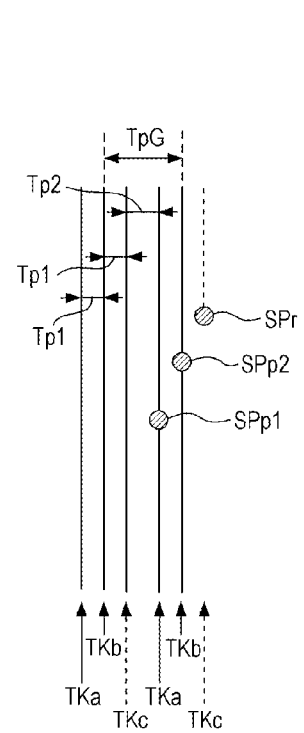

Next, FIG. 8B is an example wherein track paths TKa, TKb, and TKc of a triple spiral are separately formed. First, recording of the track paths TKa and TKb may be executed with the technique described in FIG. 6B. However, at the time of recording of the track path TKa, a track pitch is taken as Tp1+Tp1+Tp2 (which equals TpG). FIG. 8B illustrates, as illustrated with a solid line, a case where after the tracks of the track paths TKa and TKb are formed, the track of the track path TKc (dashed line) is recorded as the third spiral track.

The optical pickup 1 irradiates the two laser spots SPp1 and SPp2 for reproduction using a reproduction power laser, and the one laser spot SPr for recording using a recording power laser on the layer L of the optical disc 90.

In this case, the laser spots SPp1 and SPp2 for reproduction are tracking controlled as to the two tracks of the track paths TKa and TKb illustrated with a solid line. However, at least the laser spot SPp2 for reproduction may be on-tracking controlled as to the track of the track path TKb.

For example, in the event that the laser spots SPp1 and SPp2 for reproduction are separated in the radial direction by the track pitch Tp1, tracking control may be performed so that the middle of the laser spots SPp1 and SPp2 for reproduction are located in the middle of the track paths TKa and TKb.

The laser spot SPr for recording is irradiated in a state separated from the laser spot SPp2 for reproduction in the disc radial direction by the track pitch Tp1. Thus, the track of the track path TKc forming the third spiral adjacent to the track paths TKa and TKb is recorded. As a result, there can be performed data recording using the information recording tracks as illustrated in FIGS. 3A and 3B having a triple spiral, the track pitches Tp1 and Tp2, and the track group pitch TpG.

Next, a reproduction operation will be described with reference to FIG. 8C. This is a reproduction operation example in the case that the information recording track having a triple spiral configuration as illustrated in FIGS. 3A and 3B have been formed by a recording operation (or reproduction-only disc) such as FIG. 8A or FIG. 8B.

In this case, the optical pickup 1 irradiates three laser spots SPp1, SPp0, and SPp2 for reproduction using a reproduction power laser on the layer L of the optical disc 90. The laser spots SPp1, SPp0, and SPp2 are irradiated in a state mutually separated in the disc radial direction by the track pitch Tp1. The laser spots SPp1, SPp0, and SPp2 for reproduction are arranged to be on-track as to the tracks TKx, TKx+1, and TKx+2 of the track pitch Tp1, respectively.

Though the track pitch Tp1 is a narrower track pitch than that which is equivalent to optical cut-off, a tracking error signal can be obtained as a difference signal of the radial contrast signals obtained from the reflected light information of the two laser spots SPp1 and SPp2 for reproduction of the three. According to tracking servo control using this tracking error signal, the laser spots SPp1, SPp0, and SPp2 for reproduction are on-track as to the tracks TKx, TKx+1, and TKx+2, respectively.

The data of the tracks TKx, TKx+1, and TKx+2 can be reproduced from the reflected light information of the laser spots SPp1, SPp0, and SPp2 for reproduction. Also, triple spiral track paths are simultaneously reproduced, whereby high transfer rating can be realized.

The recording operations exemplified in FIGS. 6A, 6B, 7A, 7B, 8A, and 8B are a recording method wherein a track group is formed of multiple tracks being adjacent with the track pitch Tp1, and also tracking control of a laser beam for recording is performed so that adjacent track groups are separated with the track group pitch TpG to form an information recording track on a recording medium.

In particular, according to the laser beam for recording, an information recording track having a multi-spiral configuration with independent multiple track paths being formed in a spiral shape is formed, and also a track group of the track pitch Tp1 is formed with the multiple track paths. Tracking control of the laser spots for recording is then performed so that track groups rounded and adjacent with the multi-spiral configuration have the track group pitch TpG.

As a result, the optical disc 90 having the track pitch Tp1 (Tp1 and Tp2 in some cases) equal to or smaller than that which is equivalent to optical cut-off can be realized, and high-density recording according to narrowing of track pitch can be realized as a whole.

Figure 8C:
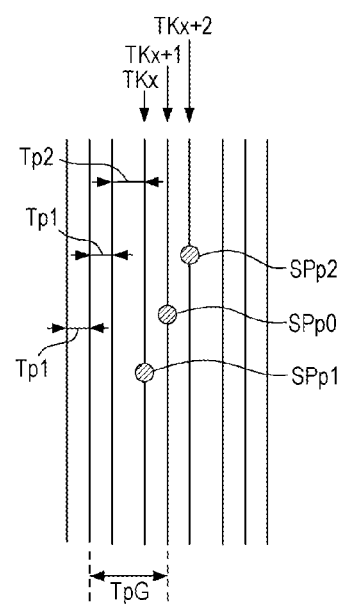

Also, the reproduction operation exemplified in FIGS. 6C and 8C is a reproducing method wherein at least two laser spots for reproduction are irradiated on multiple tracks within a track group, a difference signal of the radial contrast signals obtained from the reflected light information of the two laser spots for reproduction is taken as a tracking error signal, and according to tracking servo control using the tracking error signal thereof, at least one or more laser spots for reproduction are on-track-controlled as to one of information recording tracks, and data is reproduced from reflected light information thereof.

Thus, data reproduction can be realized from the optical disc 90 having the track pitch Tp1 (Tp1 and Tp2 in some cases) equal to or narrower than optical cut-off.

Also, the reproduction operation exemplified in FIGS. 7C and 7D is a reproduction method wherein the laser spot SPp45 for servo to which astigmatism making up generally a 45-degree angle as to the tangential direction of the information recording tracks has been applied, and one or more laser spots for reproduction are irradiated. A tangential push pull signal obtained from the reflected light information of the laser spot SPp45 for servo is taken as a tracking error signal, and according to tracking servo control using the tracking error signal thereof, at least one or more laser spots for reproduction are on-track-controlled as to one of information recording tracks, and data is reproduced from reflected light information thereof.

Thus, data reproduction can be realized from the optical disc 90 having the track pitch Tp1 (Tp1 and Tp2 in some cases) equal to or narrower than optical cut-off, thereby as well.

4. High-Density Due to Narrow Track Pitch

As can be understood from the above description, with the present embodiment, high density recording is realized as the optical disc 90 having the track pitch Tp1 equal to or narrower than that which is equivalent to optical cut-off, and so forth. Also, according to the present embodiment, reproduction of data can be realized from such an optical disc 90, which enables a recording/reproduction system to suitably work.

Figure 10A:
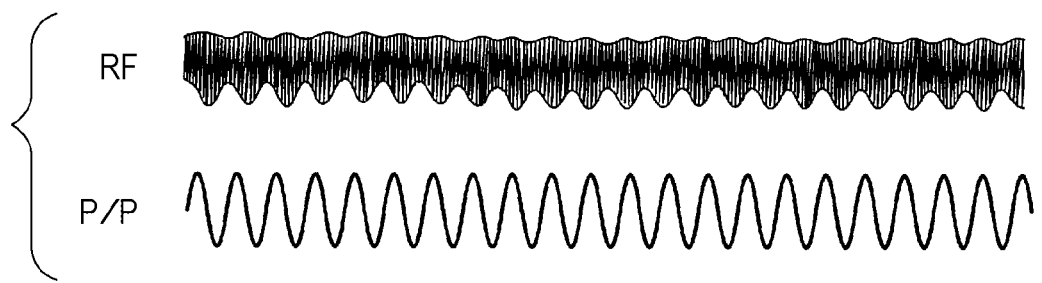
FIGS. 10A and 10B are explanatory diagrams of a signal obtained from an optical disc according to the related art.
Figure 10B:
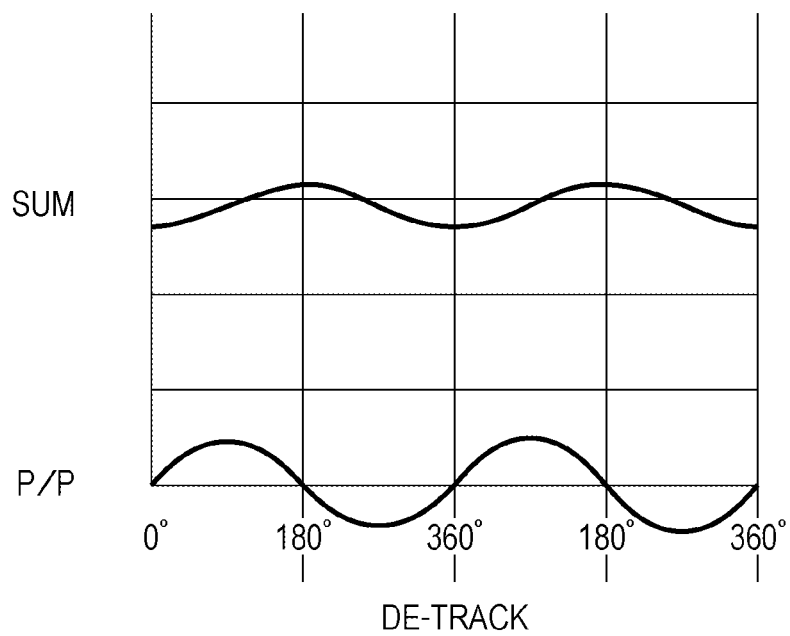

Now, description will be made regarding a reason why the information recording tracks such as FIGS. 2A through 4B are formed. First, FIGS. 10A and 10B illustrate signal waveforms that can be seen in the Blu-ray disc (registered trademark) systems according to the related art. In the case of the Blu-ray disc (registered trademark) systems, recording/reproduction is to be performed under a condition that is a combination of a laser beam with a wavelength of 405 nm (so-called blue laser), and an objective lens with NA of 0.85, and the track pitch is 0.32 μm. Also, spiral-shaped grooves are formed on a recording surface, and the grooves are taken as recording tracks.

FIG. 10A illustrates an RF signal and a push pull signal P/P (a radial push pull signal that is difference of photo detectors divided into two along the track line direction) observed in a so-called traverse state (state in which a laser spot crosses a track in the radial direction).

Also, FIG. 10B illustrates an enlarged view of a low-frequency component signal of the RF signal as a SUM signal, and the push pull signal P/P. The lateral axis is taken as de-track, and is indicated with a range of 0 through 360 degrees. 360 degrees are equivalent to the track pitch (i.e., cycle).

Signal modulation according to groove/land crossed at the time of traverse is observed from the RF signal, SUM signal, and push pull signal P/P. According to the push pull signal P/P, it can be understood that the position information in the radial direction of a laser spot (tracking error signal) can be detected.

Figure 11:
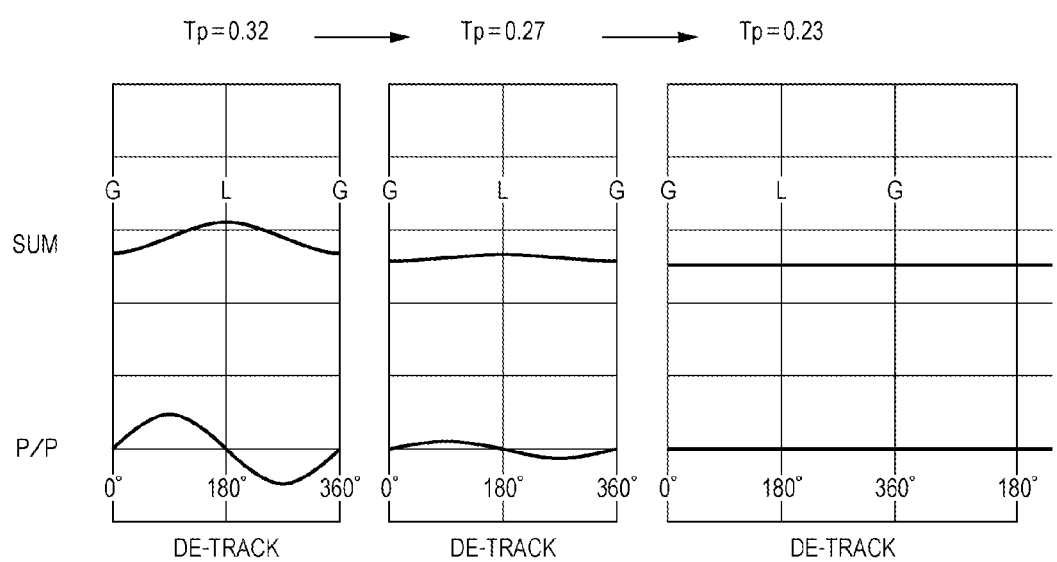
FIG. 11 is an explanatory diagram of influence on a signal due to narrowing of track pitch.

Now, let us consider further narrowing of track pitch for high density recording. FIG. 11 illustrates a SUM signal and a push pull signal P/P observed in the case that the track pitch Tp is changed from 0.32 μm to 0.27 μm and then to 0.23 μm. Note that, as the de-track of the lateral axis, "G" is a groove center location, and "L" is a land center location.

As can be understood from FIG. 11, in the event of narrowing the track pitch, modulation components decrease regarding both of the SUM signal and push pull signal P/P, and in the event of changing to 0.23 μm, no modulation element is observed. The track pitch 0.23 μm is an approximately narrower than optical cut-off in the case of a laser of which the wavelength is 405 nm, and an optical system of which the NA is 0.85.

Figure 12:
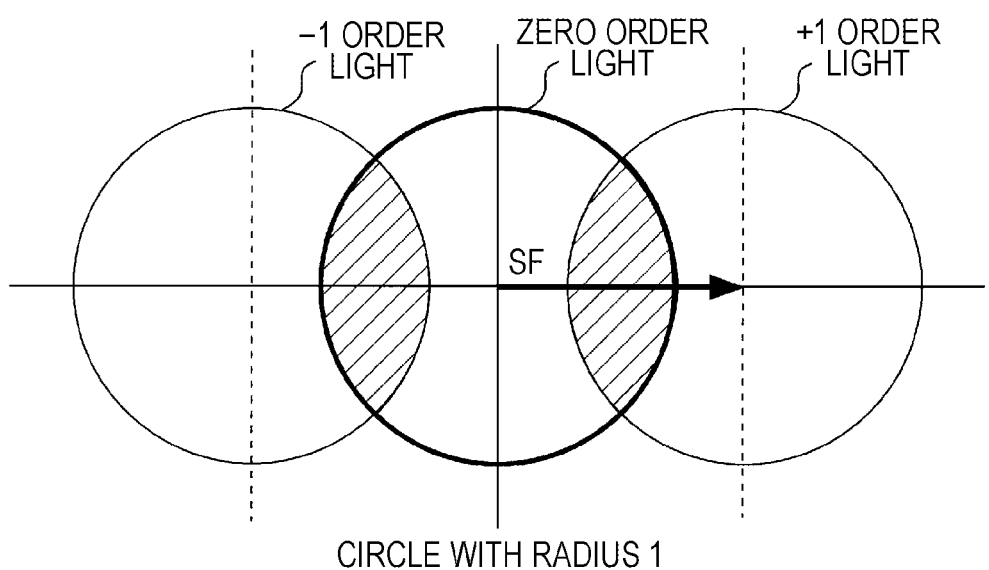
FIG. 12 is an explanatory diagram of optical cut-off.

Optical cut-off will be described with reference to FIG. 12. FIG. 12 illustrates zero order light and diffracted light (+1 order light, −1 order light) of a laser beam. The shift amount of the diffracted light is indicated as an arrow SF in the drawing.

The shift amount of the diffracted light in the case that the radius of a circle is taken as "1" is represented with $$\text{Shift Amount of Diffracted Light} = \lambda/(NA \cdot p) = (\lambda/NA)/p$$

where λ is wavelength, and p is the cycle of a cyclical configuration. The cyclical configuration is the cycle of a land/groove configuration, for example.

With regard to a laser beam (reflected light) input to a photo detector, an overlapped portion of zero order light and ±1 order light is equivalent to a modulation component. That is to say, the greater the area of the overlapped portion illustrated as a shaded area is, the more difference between light and darkness at the time of detection at a photo detector increases, and a grate signal modulation is obtained.

In the case of a circle of which the radius is "1", when the shift amount of the diffracted light becomes "2", there is no overlapped portion, and no modulation component is obtained. That is to say, when (λ/NA)/p=2 holds, no modulation component is obtained.

In the case of the wavelength λ and NA of a Blu-ray disc (registered trademark) system, the cycle p of the cyclical configuration wherein the shift amount becomes "2" is 0.24 μm. Accordingly, as for a track pitch equivalent to the cycle p of the cyclical configuration, 0.24 μm is a pitch equivalent to optical cut-off.

The summary of the above description is as follows.
When cycle p≦λ/(2NA), no modulation component is obtained.
When cycle p>λ/(2NA), a modulation component is obtained.

Thus, in the event of considering high-density recording according to narrowing of track pitch, it is difficult to perform narrowing of track pitch exceeding that which is equivalent to optical cut-off. Accordingly, when considering the same wavelength and NA as with a Blu-ray disc (registered trademark) system, the limit of the track pitch is 0.25 μm, and in reality, modulation components are scarcely obtained at 0.25 μm, and accordingly, 0.27 μm or more is a realistic track pitch.

Further, though a Blu-ray disc (registered trademark) system has a groove/land configuration, the optical disc 90 according to the present embodiment does not have a groove/land configuration formed on the layer L. The reason why no groove/land configuration is formed on the layers L is because this is advantageous for multi-layering.

With such a situation, we have studied significant high-density recording according to narrowing of track pitch. In the case of no groove/land configuration being formed, a track itself serving as a mark row or embossed pit row has a cyclical configuration which affects on signal modulation in the radial direction.

In this case, in the event of forming an information recording track with the track pitch Tp1 alone equal to or narrower than that which is equivalent to optical cut-off, no modulation component is obtained, and tracking servo is not applied.

However, in order to obtain a modulation component as a signal of reflected light information, we have found that even if an information recording track includes the track pitch Tp1 alone equal to or narrower than that which is equivalent to optical cut-off serving as cycle p≦λ/(2NA), inconvenience according to this can be cancelled out by a track group being configured so as to have cycle p>λ/(2NA). That is to say, it is desirable that as a cyclical configuration according to a track group, the track group thereof is formed with a track group pitch TpG greater than that which is equivalent to optical cut-off.

That is to say, the information recording tracks having a configuration exemplified in FIGS. 2A, 2B, 3A, 3B, 4A, and 4B are formed, whereby modulation components can be obtained as reflected light information even if the information recording tracks include the track pitch Tp1 equal to or narrower than that which is equivalent to optical cut-off.

Figure 13:
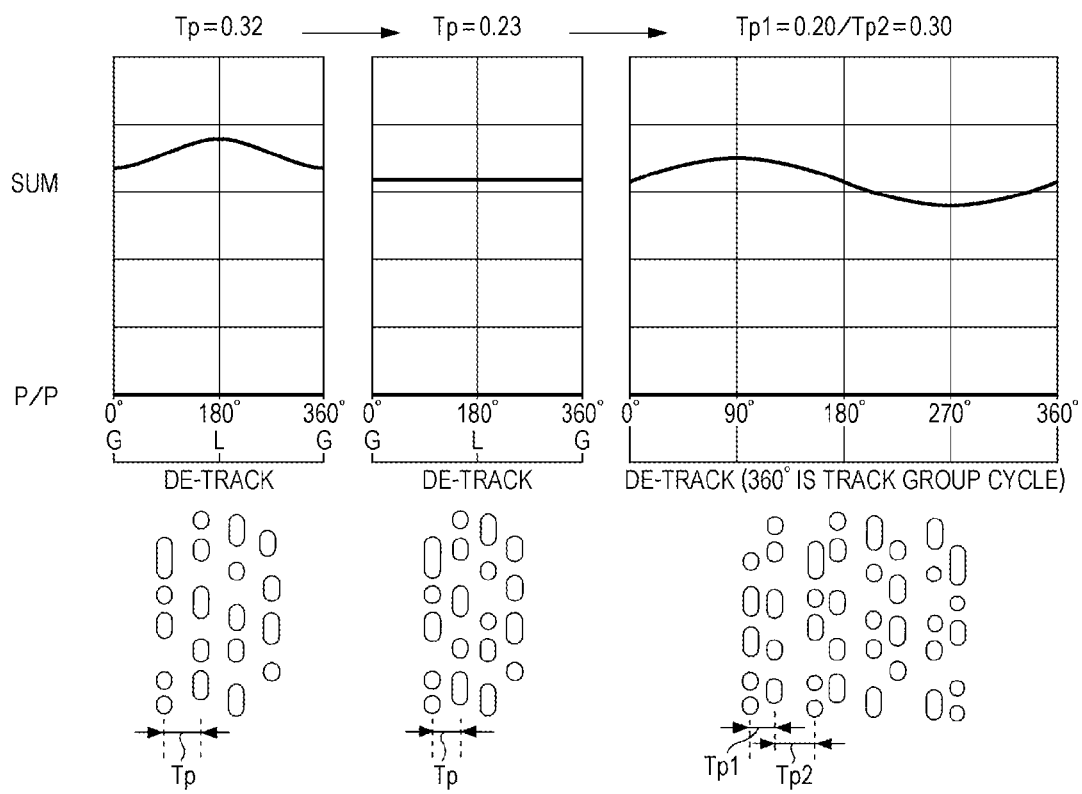
FIG. 13 is an explanatory diagram of a signal to be modified in an embodiment.

FIG. 13 illustrates, with wavelength λ=405 nm, and NA=0.85, a SUM signal and a push pull signal P/P in various track pitch configurations in the case that no groove/land configuration is provided to the layer L.

First, as described above, in the same way as with a common Blu-ray disc (registered trademark) system, if we say that the track pitch Tp=0.32 μm, the modulation of the SUM signal is observed. When the track pitch is reduced to the track pitch Tp=0.23 μm equal to or narrower than that which is equivalent to optical cut-off, no modulation component is observed.

Now, let us assume a track configuration having the track pitches Tp1 and Tp2 as described in FIGS. 2A and 2B. Here, let us say that Tp1=0.20 μm, and Tp2=0.30 μm. Thus, modulation components are observed as the SUM signal. Consequently, modulation components according to de-track amount are obtained. In this case, the track group pitch TpG is 0.50 μm.

Note that, with a drawing of a signal waveform in the case that Tp1=0.20 μm and Tp2=0.30 μm, 360 degrees in the de-track of the lateral axis is a track group cycle (equivalent to track group pitch TpG). Note that in the case that Tp=0.32 μm, and in the case that Tp=0.23 μm (further in the cases of FIGS. 10A, 10B, and 11), 360 degrees in the lateral axis is a track cycle, which differs from the above. That is to say, in the case that Tp1=0.20 μm and Tp2=0.30 μm, the SUM signal indicates that one cycle worth of modulation components have been obtained in increments of track group cycles.

With the following drawings as well, in expression of de-track in the case of having a track group configuration, 360 degrees indicates a track group cycle. Also, in the event that the layer L has a mirror surface configuration including no groove/land configuration, no push pull signal P/P is obtained when a recorded mark has no phase difference.

Figure 14:
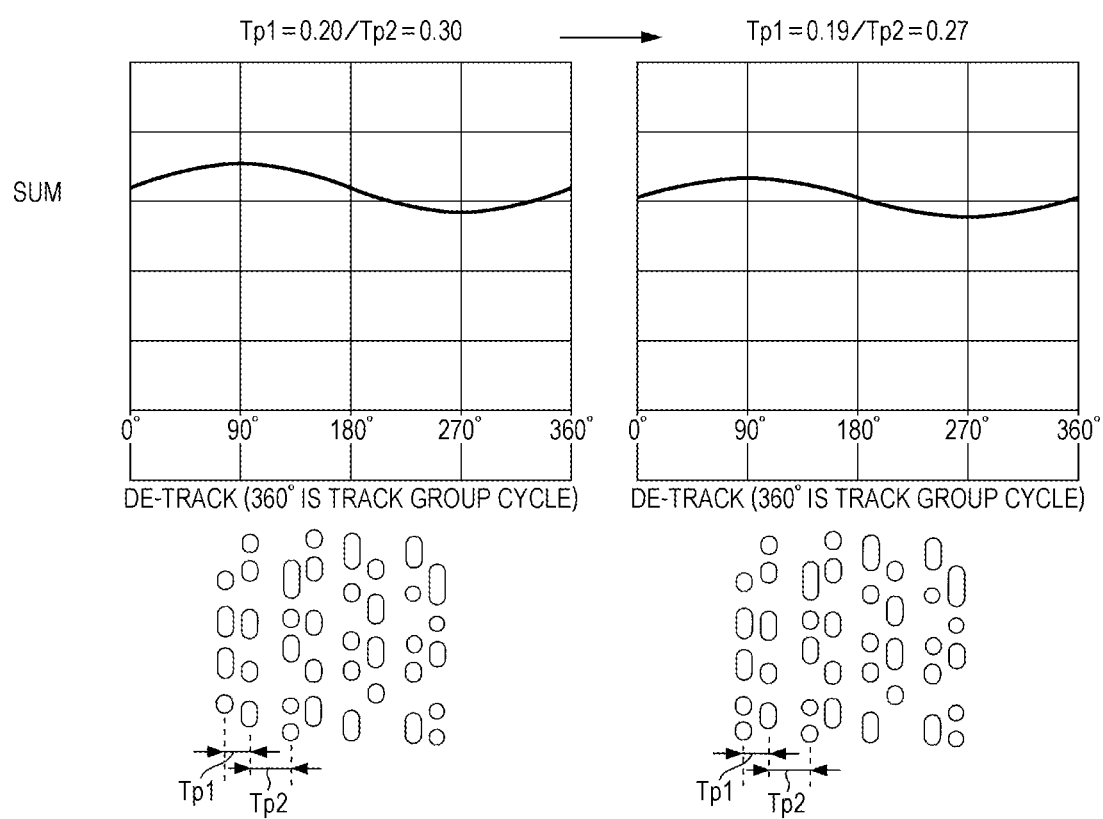
FIG. 14 is an explanatory diagram of detection sensitivity of a signal to be modified in an embodiment.

Sufficient modulation of the SUM signal has been obtained in the case that Tp1=0.20 μm and Tp2=0.30 μm, and accordingly, further narrowing of track pitch has been studied, the results of which are shown in FIG. 14.

Though a case where Tp1=0.19 μm and Tp2=0.27 μm is additionally illustrated in FIG. 14, in this case as well, sufficient modulation of the SUM signal has been obtained. In this case, the track group pitch TpG is 0.46 μm, this means that the mean value of the track pitches is 0.23 μm, i.e., even in a state in which the mean value is equal to a track pitch wherein no modulation component is observed in FIG. 13, sufficient modulation is obtained.

As described above, it has been confirmed that the configuration of the information recording track according to the embodiment is employed, and accordingly, even if the information recording track includes the track pitch Tp1 equal to or narrower than that which is equivalent to optical cut-off, a cyclical configuration which does not reach optical cut-off, i.e., a track group of the track group pitch TpG is included, and accordingly, the modulation components of a signal corresponding to the radial direction (tracking control direction) are obtained.

5. Tracking Technique

Modulation components are obtained as the SUM signal, and accordingly, the following tracking techniques exemplified in FIGS. 15A through 21C are available regarding the optical disc 90 according to the present embodiment.

Figure 15A:
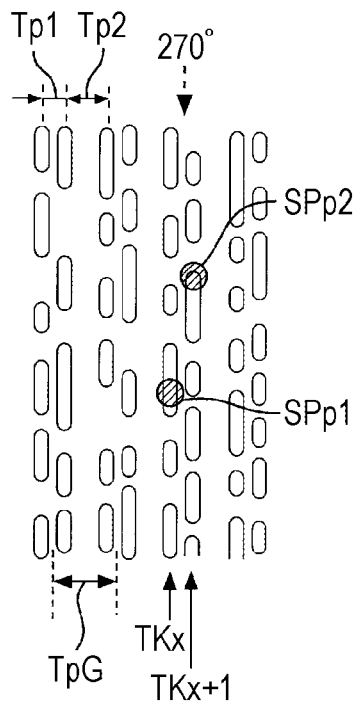
FIGS. 15A through 15C are explanatory diagrams of a tracking system using two spots according to an embodiment.
Figure 15B:
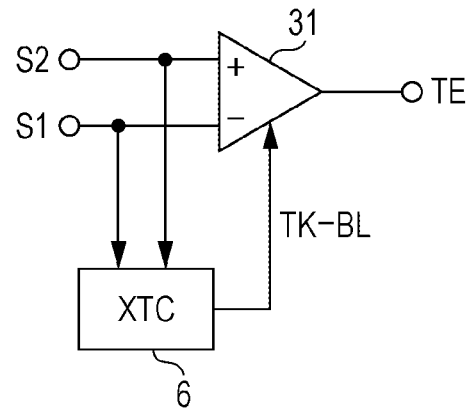
Figure 15C:
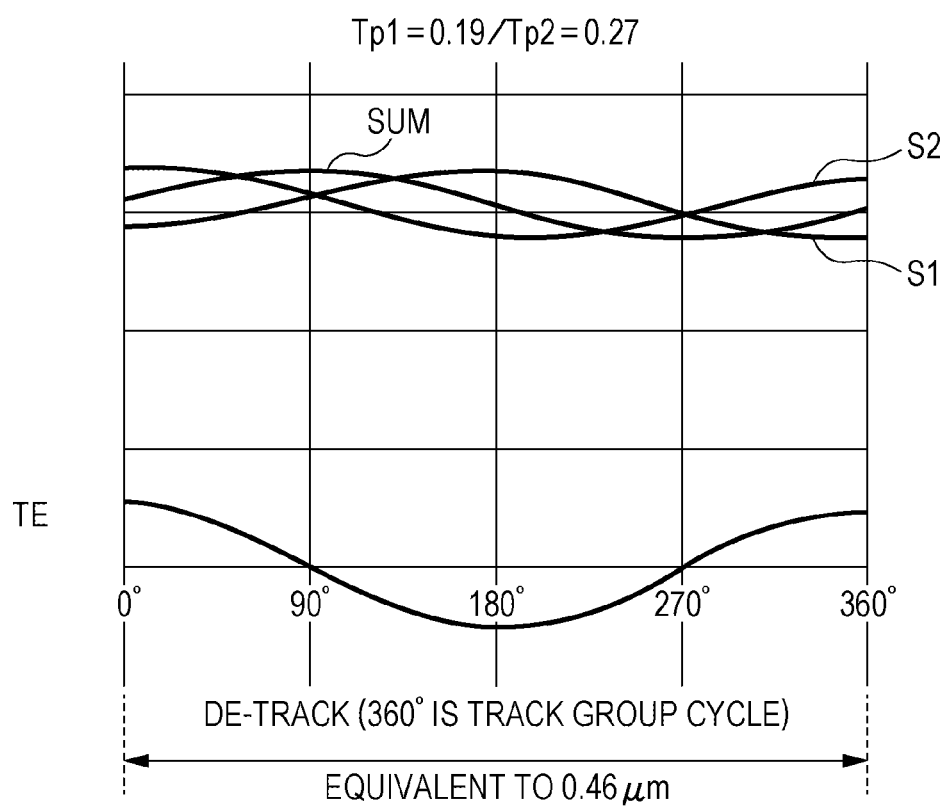

FIGS. 15A through 15C illustrate a tracking error signal calculation technique that can be applied to the recording operation in FIG. 6A or FIG. 8B, and the reproduction operation in FIG. 6C.

FIG. 15A illustrates an information recording track having a double spiral configuration. Let us say that laser spots SPp1 and SPp2 for reproduction are laser beams for servo to detect a tracking error signal. Tracking control is performed so as to have the laser spots SPp1 and SPp2 for reproduction trace a track group of double spiral tracks TKx and TKx+1. For example, let us say that the center of the tracks TKx and TKx+1 is a location of de-track amount 270 degrees. (360 degrees are a track group cycle; this is also true in the following FIGS. 16A through 22C).

Let us say that the reflected light amount signals of the laser spots SPp1 and SPp2 for reproduction are taken as S1 and S2. In this case, as illustrated in FIG. 15B, computation of the reflected light amount signals S2−S1 is performed by a differential computation circuit 31, whereby a tracking error signal TE can be generated.

As for the reflected light amount signals S1 and S2, as illustrated in FIG. 15C, modulation components serving as a radial contrast signal are obtained. For example, in the event that the laser spots SPp1 and SPp2 for reproduction have been shifted to the right in FIG. 15A, the reflected light amount signal S1 becomes dark (signal level decreases), and the reflected light amount signal S2 becomes bright (signal level increases).

Note that here is illustrated a case where Tp1=0.19 μm and Tp2=0.27 μm (TpG=0.46). Also, the SUM signal in this case is a signal in the case of considering a virtual spot in the intermediate location in the disc radial direction of the laser spots SPp1 and SPp2 for reproduction.

The tracking error signal TE according to de-track amount in increments of track groups is obtained as S2−S1 that is difference of the radial contrast components.

Servo control toward a 270-degree location is performed based on this tracking error signal TE, whereby tracking control according to the laser spots SPp1 and SPp2 for reproduction can be performed such as FIG. 15A. Thus, the recording operation in FIG. 6A or FIG. 8B or the reproduction operation in FIG. 6C can be executed.

Incidentally, in FIG. 15B, the reflected light amount signals S1 and S2 are input to the crosstalk cancel circuit 6, and the operation of the differential computation circuit 31 is adjusted with a balance control signal TK-BL from the crosstalk cancel circuit 6.

This is because balance may be shifted with the recorded states of the tracks by simply removing differential between the reflected light amount signals S1 and S2. The crosstalk cancel circuit 6 detects the crosstalk components in adjacent tracks, whereby the light amount balance shift of the tracks TKx and TKx+1 can be corrected. Therefore, the crosstalk cancel circuit 6 outputs the balance control signal TK-BL so that the crosstalk components of the adjacent tracks are mutually balanced.

The differential computation circuit 31 performs balance adjustment computation so as to apply a correction coefficient corresponding to the recorded state of each track to the reflected light amount signals S1 and S2 according to the balance control signal TK-BL, and then performs computation of S2−S1, or adds an offset bias to the computation result thereof as appropriate, thereby generating a tracking error signal TE which is hardly affected by the recorded state.

Note that, though drawing is omitted in FIG. 15B, the reflected light amount signals S1 and S2 subjected to crosstalk cancel processing at the crosstalk cancel circuit 6 are supplied to the data detection processing unit 5 illustrated in FIG. 5. That is to say, in the event of performing reproduction in FIG. 6C, the reflected light amount signals S1 and S2 are employed for reproduction of data as the RF signal regarding the tracks TKx and TKx+1.

Figure 16A:
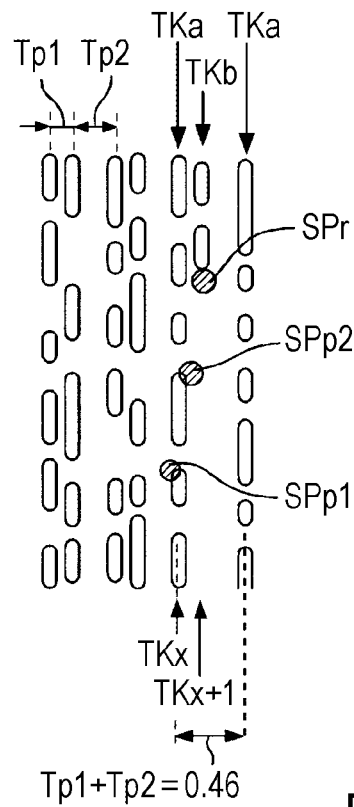
FIGS. 16A through 16C are explanatory diagrams of a recording operation using tracking of two spots according to an embodiment.
Figure 16B:
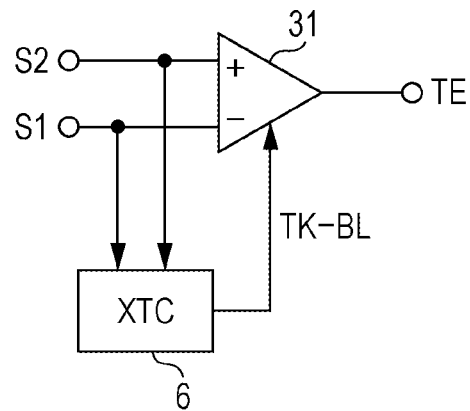
Figure 16C:
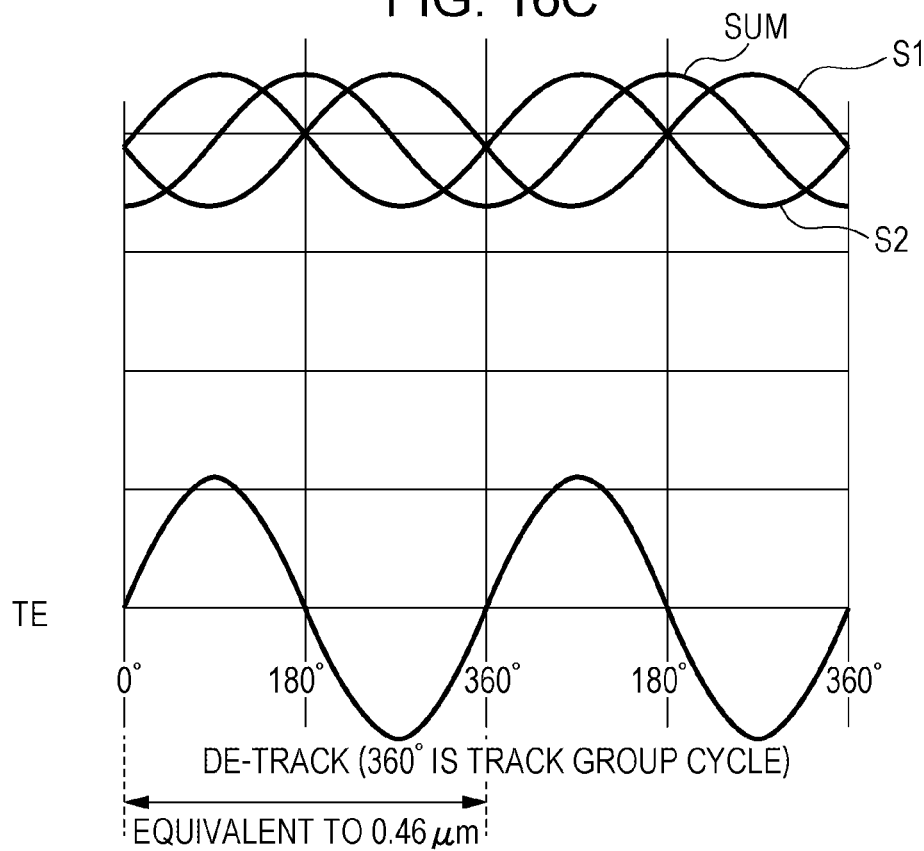

Next, FIGS. 16A through 16C illustrate a tracking error signal computation technique that can be applied to the recording operation in FIG. 6B. As illustrated in FIG. 16A, laser spots SPp1 and SPp2 for reproduction are taken as laser beams for servo to detect a tracking error signal, and tracking control is performed so as to have the laser spots SPp1 and SPp2 for reproduction trace one track TKx of a double spiral while pinching this.

In this state, the adjacent tracking servo is performed, and an adjacent track TKx+1 is recorded using the laser spot SPr for recording. In this case as well, the tracking error signal TE can be obtained by computation of S2−S1 of the reflected light amount signals at the differential computation circuit 31 as illustrated in FIG. 16B. Also, in this case as well, adjustment of the reflected light amount signals S1 and S2 may be performed using the balance control signal TK-BL from the crosstalk cancel circuit 6.

Note that the track pitch is wide at the time of recording, and accordingly, with regard to the RF output from the laser spots SPp1 and SPp2 from reproduction, the most part thereof is from the track TKx, and the signal reproduction of the track TKx, and the balance control signal TK-BL can be obtained using a comparison result between the RF output and output signals from the laser spots SPp1 and SPp2 for reproduction.

FIG. 16C illustrates various signal waveforms. Note that FIG. 16C illustrates a case where the track of a track path TKa has been recorded, and thereafter, the track of a track path TKb is recorded, and accordingly, the track pitch before recording is Tp1+Tp2=0.46 μm.

Radial contrast modulation components are obtained as the reflected light amount signals S1 and S2, and the SUM signal as illustrated in the drawing. The tracking error signal TE according to de-track amount is obtained as S2−S1.

In this case, servo control toward a zero-degree location is performed based on the tracking error signal TE, whereby tracking control using the laser spots SPp1 and SPp2 for reproduction can be performed such as FIG. 16A. Thus, the recording operation in FIG. 6B can be executed.

Figure 17A:
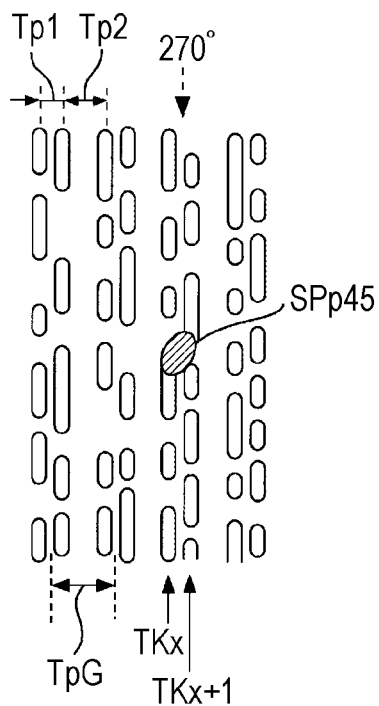
FIGS. 17A through 17C are explanatory diagrams of a tracking system using an astigmatic spot according to an embodiment.
Figure 17B:
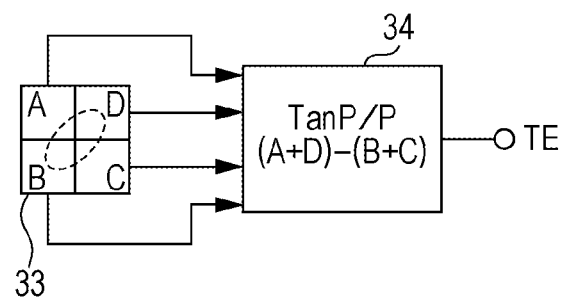
Figure 17C:
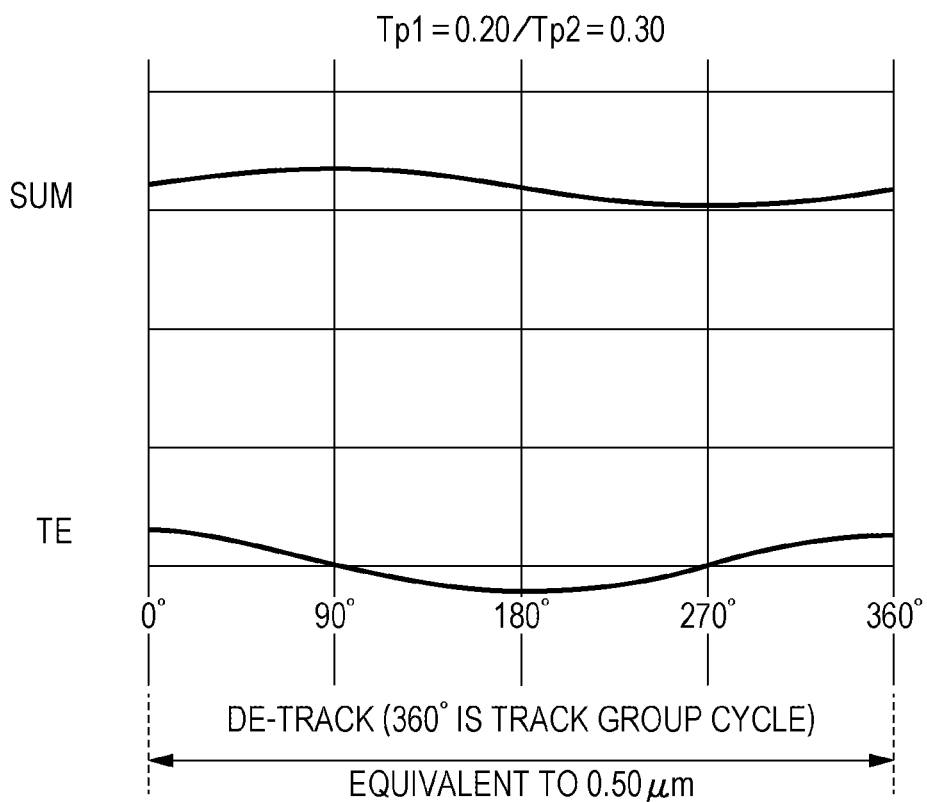

Next, FIGS. 17A through 17C illustrate a tracking error signal computation technique that can be applied to the recording operation in FIG. 7A, and the reproduction operation in FIGS. 7C and 7D. As illustrated in FIG. 17A, the optical pickup 1 irradiates the laser spot SPp45 for servo to which astigmatism making up generally a 45-degree angle as to the tangential direction of the information recording tracks has been applied on the layer L of the optical disc 90. Tracking control is then performed so as to have the laser spot SPp45 for servo trace a track group of the tracks TKx and TKx+1.

In this case, with the optical pickup 1, the reflected light of the laser spot SPp45 for servo is received at a quartered photo detector 33 illustrated in FIG. 17B. The signals obtained at light-receiving surfaces A, B, C, and D are supplied to a computation circuit 34.

The computation circuit 34 subtracts the signal of the light-receiving surfaces B+C from the signal of the light-receiving surfaces A+D to output this as a tracking error signal TE. That is to say, a tangential push pull signal that is a difference signal of the photo detectors divided in the vertical direction as to the track line direction becomes a tracking error signal TE.

FIG. 17C illustrates signal waveforms. Here, the signal waveforms are illustrated in the case that Tp1=0.20 μm, Tp2=0.30 μm, and TpG=0.50 μm. Also, astigmatic amount is in the case that Z6=0.275. (Z6 is Z6 in a Fringe Zernike polynomial expression)

As illustrated in the drawing, a signal according to de-track amount is obtained as an tracking error signal TE according to a tangential push pull signal. Servo control toward a 270-degree location is performed based on this tracking error signal TE, whereby tracking control for having the laser spot SPp45 for servo trace a track group can be performed as illustrated in FIG. 17A. Thus, the recording operation in FIG. 7A and the reproduction operation in FIG. 7C can be executed.

Figure 18A:
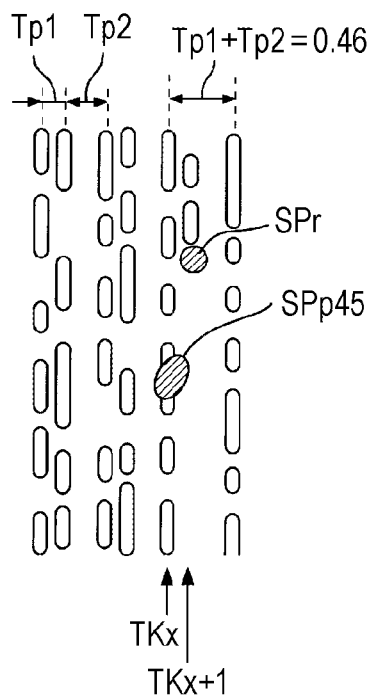
FIGS. 18A through 18C are explanatory diagrams of a recording operation using tracking of an astigmatic spot according to an embodiment.
Figure 18B:
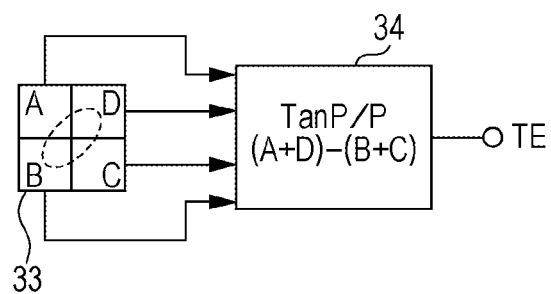
Figure 18C:
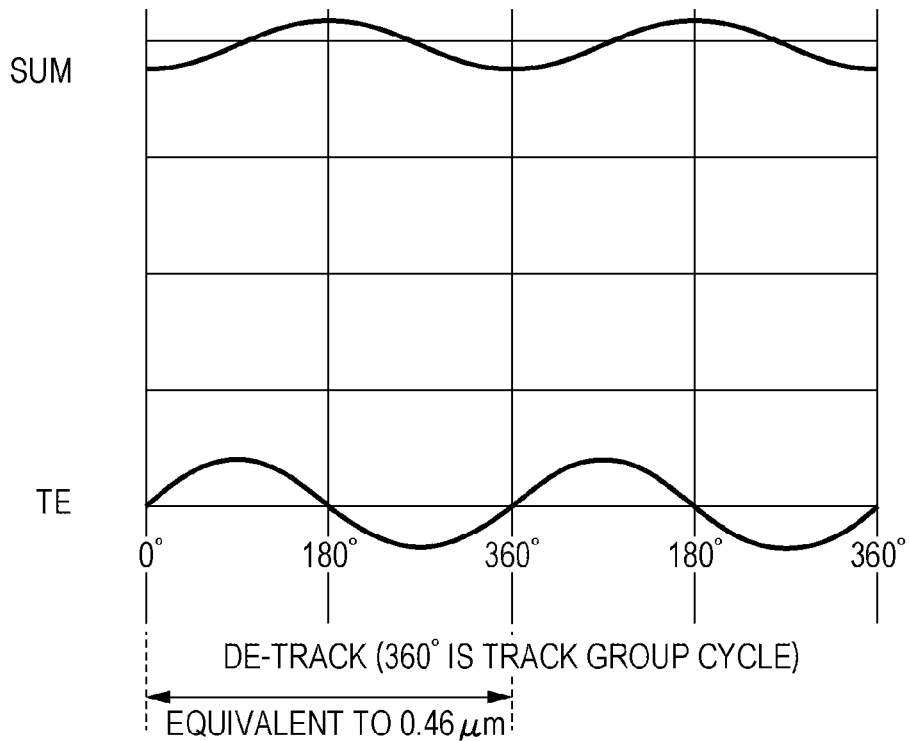

Next, FIGS. 18A through 18C illustrate a tracking error signal computation technique that can be applied to the recording operation in FIG. 7B. As illustrated in FIG. 18A, the optical pickup 1 irradiates the laser spot SPp45 for servo on the layer L of the optical disc 90, and has the laser spot SPp45 for servo trace the track TKx already formed of the double spiral. In this state, the adjacent tracking servo is performed, and the adjacent track TKx+1 is recorded by the laser spot SPr for recording.

In this case as well, as illustrated in FIG. 18B, a tangential push pull signal obtained by performing computation of (A+D)−(B+C) at the computation circuit 34 becomes a tracking error signal TE.

FIG. 18C illustrates signal waveforms. Note that the signal waveforms are illustrated in the case that the track of the track path TKa has been recorded, and the track of the track path TKb will be recorded from now on, and accordingly, the track pitch before recording is Tp1+Tp2=0.46 μm. Also, the astigmatic amount is that of in the case that Z6=0.262.

As illustrated in the drawing, a signal according to de-track amount is obtained as an tracking error signal TE according to a tangential push pull signal. Servo control toward a 0-degree location is performed based on this tracking error signal TE, whereby tracking control for having the laser spot SPp45 for servo trace the track TKx can be performed as illustrated in FIG. 18A. Thus, the recording operation in FIG. 7B can be executed.

Figure 19A:
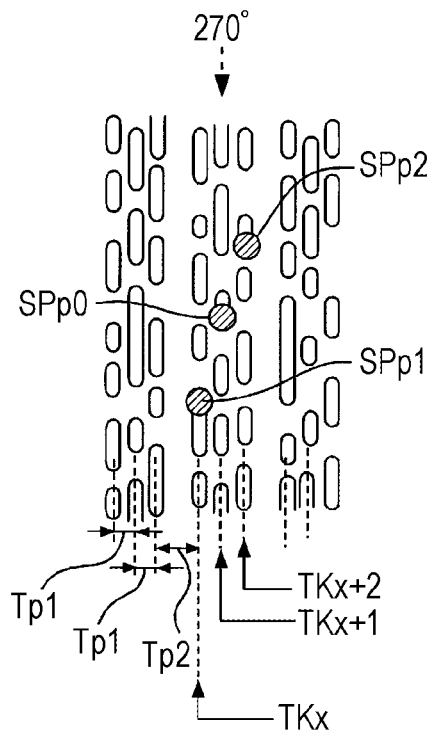
FIGS. 19A through 19C are explanatory diagrams of a tracking system using two spots at the time of 3-spot irradiation according to an embodiment.
Figure 19B:
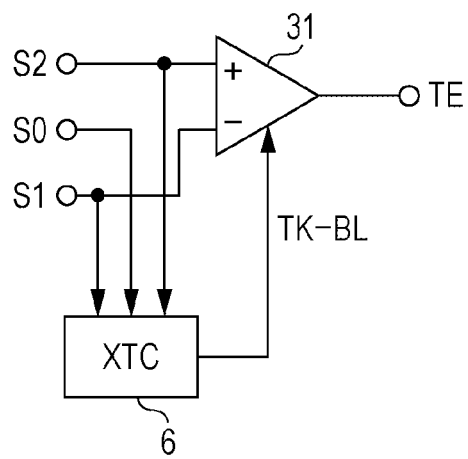
Figure 19C:
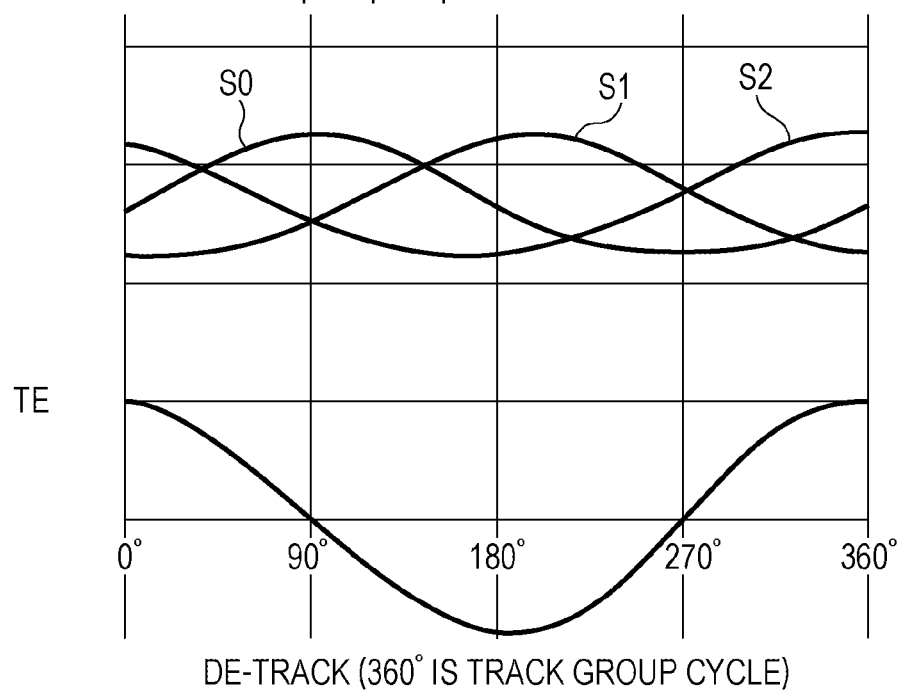

Next, FIGS. 19A through 19C illustrate a tracking error signal calculation technique that can be applied to the recording operation in FIG. 8A, and the reproduction operation in FIG. 8C. FIG. 19A illustrates an information recording track having a triple spiral configuration.

Let us say that laser spots SPp1, SPp0, and SPp2 for reproduction are laser beams for servo to detect a tracking error signal. Tracking control is performed so as to have the laser spots SPp1, SPp0, and SPp2 for reproduction trace a track group of triple spiral tracks TKx, TKx+1, and TKx+2. Let us say that the center of the tracks TKx, TKx+1, and TKx+2 is a location of de-track=270 degrees.

Let us say that the reflected light amount signals of the laser spots SPp1, SPp0, and SPp2 for reproduction are taken as S1, S0, and S2. In this case, as illustrated in FIG. 19B, computation of the reflected light amount signals S2−S1 is performed by the differential computation circuit 31, whereby a tracking error signal TE can be generated.

As for the reflected light amount signals S1, S0, and S2, as illustrated in FIG. 19C, modulation components serving as a radial contrast signal are obtained. Note that here is illustrated a case where Tp1=0.19 μm and Tp2=0.26 μm.

The tracking error signal TE according to de-track amount in increments of track groups is obtained as S2−S1 that is difference of the radial contrast components. Servo control toward a 270-degree location is performed based on this tracking error signal TE, whereby tracking control according to the laser spots SPp1 and SPp2 for reproduction can be performed such as FIG. 19A. Thus, the recording operation in FIG. 8A or the reproduction operation in FIG. 8C can be executed.

Also, in FIG. 19B, the reflected light amount signals S1, S0, and S2 are input to the crosstalk cancel circuit 6, and the operation of the differential computation circuit 31 is adjusted with the balance control signal TK-BL from the crosstalk cancel circuit 6.

As previously described in the case of FIGS. 15A through 15C, the differential computation circuit 31 performs balance adjustment computation so as to apply a correction coefficient corresponding to the recorded state of each track to the reflected light amount signals S1 and S2 according to the balance control signal TK-BL, and then performs computation of S2−S1, or adds an offset bias to the computation result thereof as appropriate, whereby a tracking error signal TE which is hardly affected by the recorded state can be generated.

Note that, though drawing is omitted in FIG. 19B, the reflected light amount signals S1, S0, and S2 subjected to crosstalk cancel processing at the crosstalk cancel circuit 6 are supplied to the data detection processing unit 5 illustrated in FIG. 5. That is to say, in the event of performing reproduction in FIG. 8C, the reflected light amount signals S1, S0, and S2 are employed for reproduction of data as the RF signal regarding the tracks TKx, TKx+1, and TKx+2.

Figure 20A:
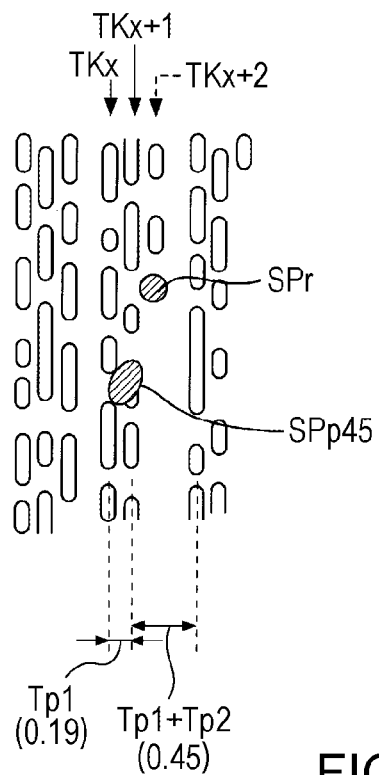
FIGS. 20A through 20C are explanatory diagrams of a recording operation using tracking of an astigmatic spot regarding a triple spiral track according to an embodiment.
Figure 20B:
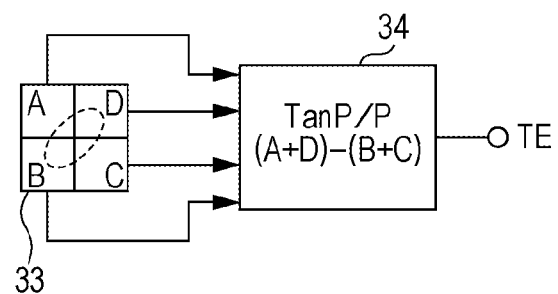
Figure 20C:
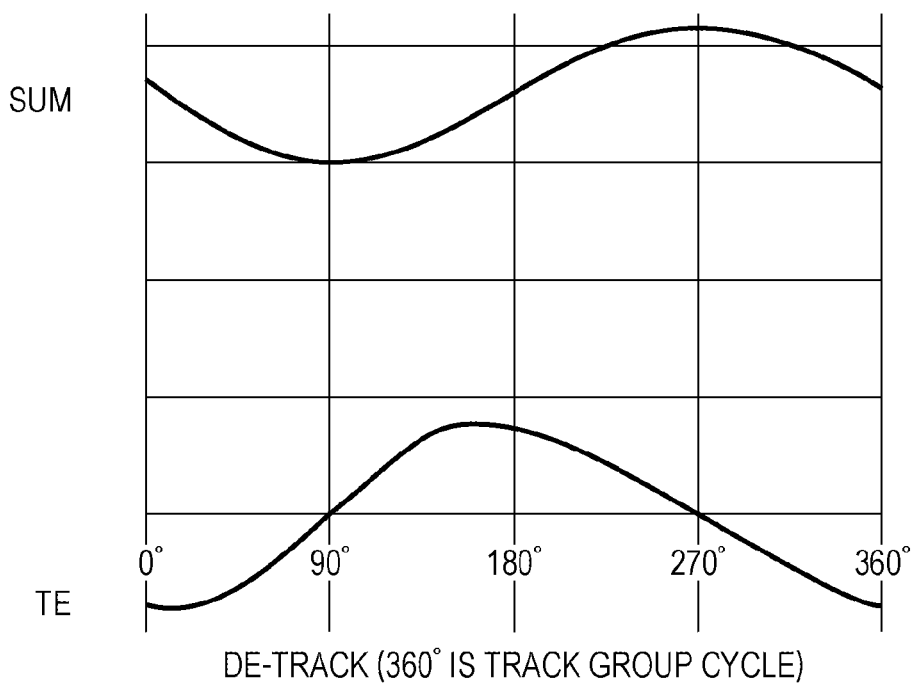

Next, FIGS. 20A through 20C are an example wherein in a state in which the tracks of the track paths TKa and TKb have already been formed, at the time of recording a third tracking path TKc, tracking is performed using the laser spot SPp45 for servo to which astigmatism has been applied.

With regard to the recording operation in FIG. 8B, as previously described in FIGS. 15A through 15C, though it is desirable to execute the tracking servo system using the two laser spots SPp1 and SPp2, here is illustrated an example using the one laser spot SPp45 for servo.

As illustrated in FIG. 20A, tracking control is performed so as to have the laser spot SPp45 for servo trace the tracks TKx and TKx+1 of the track paths TKa and TKb which have already been formed. In this case, as illustrated in FIG. 20B, a tangential push pull signal is obtained at the computation circuit 34, whereby this can be taken as the tracking error signal TE.

As illustrated in FIG. 20C, a signal according to de-track amount is obtained as the tracking error signal TE. Servo control toward a 90-degree location is performed based on this tracking error signal TE, whereby tracking control can be performed so as to have the laser spot SPp45 for servo trace the tracks TKx and TKx+1 as illustrated in FIG. 20A. According to the adjacent tracking servo in this state, the track of the third track path TKc can be recorded by the laser spot SPr for recording.

Figure 21A:
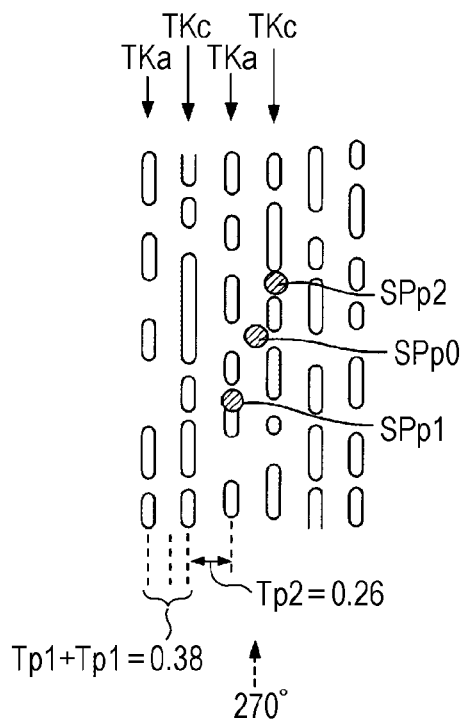
FIGS. 21A through 21C are explanatory diagrams of a tracking system at the time of 3-spot irradiation in a state without a center track according to an embodiment.
Figure 21B:
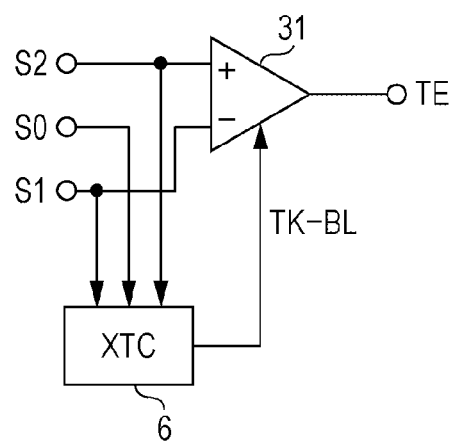
Figure 21C:
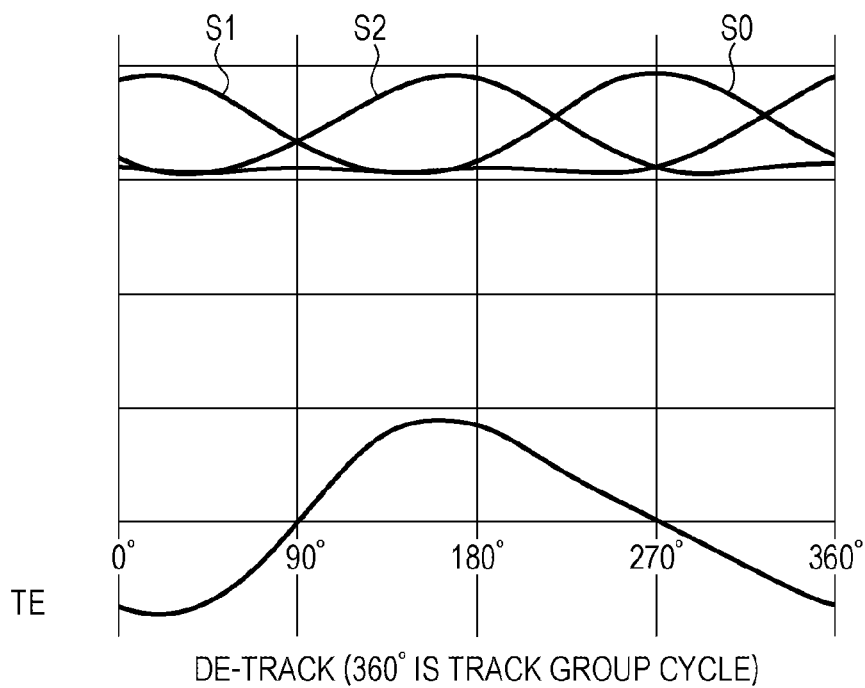

FIGS. 21A through 21C illustrate a tracking servo system which is the same servo system as the tracking servo system described in FIGS. 19A through 19C, but in a state in which of the information recording tracks of the triple spiral, the tracks of the track paths TKa and TKc have already been formed, and the middle track path TKb has been unrecorded.

As illustrated in FIG. 21A, the track of the middle track path TKb has been unrecorded, and accordingly, a pitch between the track of the track path TKa and the track of the track path TKc is Tp1+Tp1=0.38. Also, the track pitch Tp2 between track groups is 0.26. The tracking error signal TE generating system in FIG. 21B is the same as with FIG. 19B.

FIG. 21C illustrates the waveforms of the signals. In this case, though the polarity of the tracking error signal TE is contrary to the case of FIGS. 19A through 19C since there is no middle spiral, tracking servo such as FIG. 21A can be performed by performing servo control toward a 270-degree location. In this way, even in a state in which the track of the middle spiral of the triple spiral has been unrecorded, recording or reproduction can be performed by performing servo control.

Incidentally, it has previously been described that not only the track pitch Tp1 but also the track pitch Tp2 may be a track pitch equal to or narrower than that which is equivalent to optical cut-off. With the examples in FIGS. 15A through 21C, an example has been described wherein the track pitch Tp2 is wider than that which is equivalent to optical cut-off, and in this case, the track group pitch TpG is consequently wider than that which is equivalent to optical cut-off.

Figure 22A:
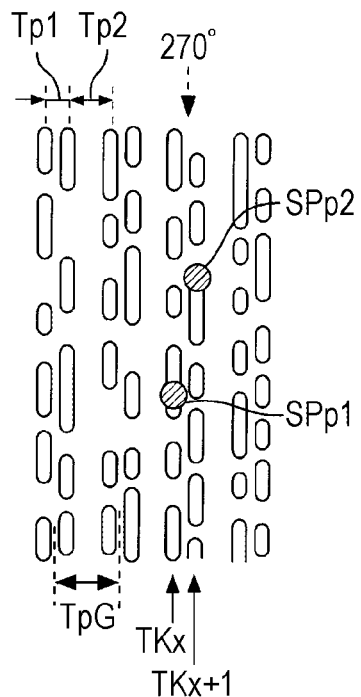
FIGS. 22A through 22C are explanatory diagrams of a tracking system using two spots in the case of further narrower tracking pitch according to an embodiment.
Figure 22B:
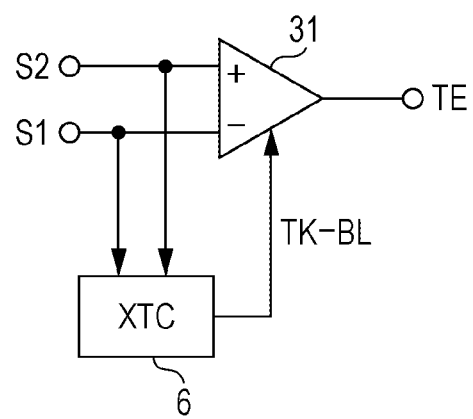
Figure 22C:
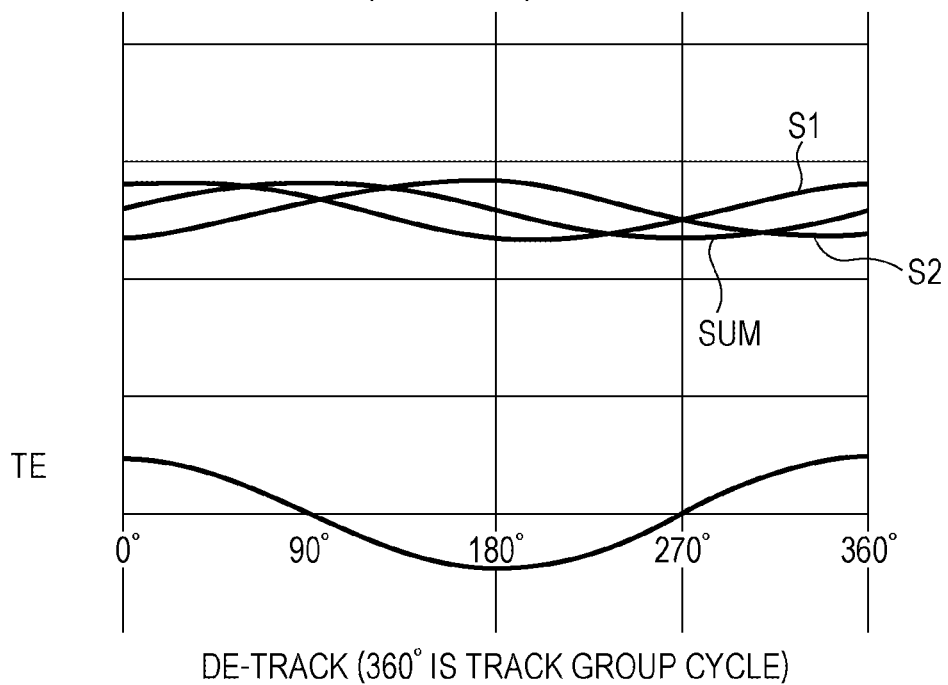

FIGS. 22A through 22C illustrate that even if the track pitches Tp1 and Tp2 are both equal to or narrower than that which is equivalent to optical cut-off, in the event that the track group pitch TpG is wider than that which is equivalent to optical cut-off, a tracking error signal TE is obtained.

FIGS. 22A, 22B, and 22C illustrate, in the same way as with FIGS. 15A, 15B, and 15C, a case where a tracking error signal TE is obtained by the radial contrast signals of the laser spots SPp1 and SPp2 for reproduction as to the information recording tracks having a double spiral configuration.

In this case, the track pitches are set as Tp1=0.15 μm and Tp2=0.23 μm, and both are track pitches equal to or narrower than that which is equivalent to optical cut-off. The track group pitch TpG is 0.38 μm. As for the reflected light amount signals S1 and S2, modulation components serving as a radial contrast signal are obtained as illustrated in FIG. 22C.

A tracking error signal TE according to de-track amount is obtained as S2−S1 that is difference of radial contrast components. Servo control toward a 270-degree location is performed based on this tracking error signal TE, whereby tracking control using the laser spots SPp1 and SPp2 for reproduction can be performed such as FIG. 22A.

In this way, even if the track pitches Tp1 and Tp2 are track pitches equal to or narrower than that which is equivalent to optical cut-off, in the event that the track group pitch TpG is wider than that which is equivalent to optical cut-off, suitable tracking servo can be performed.

Note that, in FIGS. 22A through 22C, description has been made by conforming to the tracking system in FIGS. 15A through 15C, but even in the case of the tacking systems described in FIGS. 16A through 21C, or even in the event that the track pitches Tp1 and Tp2 are equal to or narrower than that which is equivalent to optical cut-off, suitable tracking servo can be performed in the event that the track group pitch TpG is wider than that which is equivalent to optical cut-off.

6. Optical System Configuration Example

Description will be made regarding a configuration example of the optical system of the optical pickup 1 for realizing the recording operation and reproduction operation according to the above embodiment.

Figure 23:
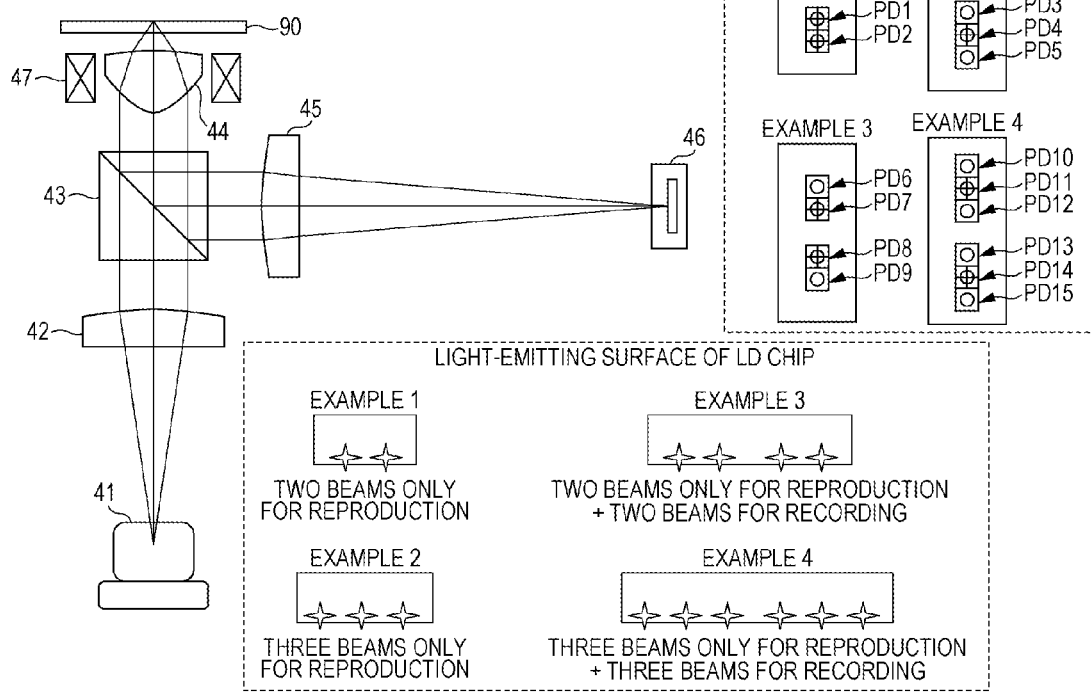
FIG. 23 is an explanatory diagram of an optical system configuration example according to an embodiment.

FIG. 23 is an example in the case of employing multiple laser spots for tracking servo such as FIGS. 6A, 6B, 6C, 8A, 8B, and 8C, for example. As the optical system within the optical pickup 1, there are provided a multi-beam LD (Laser Diode) 41, a collimator lens 42, a beam splitter 43, an objective lens 44, a multi lens 45, a light-receiving element unit 46, and a biaxial mechanism 47. The laser beam emitted from the multi-beam LD 41 is converted into parallel light at the collimator lens 42, passes through the beam splitter 43, condensed at the objective lens 44, and irradiated on the optical disc 90.

The objective lens 44 is held by the biaxial mechanism 47 so as to be displaced in the focus direction and tracking direction. The biaxial mechanism 47 is driven by the biaxial driver 18 illustrated in FIG. 5, whereby tracking servo and focus servo can be executed.

The reflected light from the optical disc 90 is reflected at the beam splitter 43 via the objective lens 44, reaches the multi lens 45, condensed at the multi lens 45, and input to the light-receiving element unit 46.

With this configuration, as for the multi-beam LD 41, the configurations of a light-emitting surface serving as Example 1 through Example 4 in the drawing can be conceived, and also, in accordance with the examples of the multi-beam LD 41, Example 1 through Example 4 can be conceived as the photo detector configuration of the light-receiving element unit 46.

With Example 1, the multi-beam LD 41 is configured to include light-emitting surfaces of two beams only for reproduction, and also, the light-receiving element unit 46 is configured to include two quartered photo detectors PD1 and PD2. This is a configuration example in the case of enabling the reproduction operation described in FIGS. 6C and 15A to be performed as a reproduction apparatus, for example.

The multi-beam LD 41 irradiates two laser spots SPp1 and SPp2 for reproduction, and also these reflected beams are detected at the photo detectors PD1 and PD2. The sum signals of the quartered light-receiving surfaces of the photo detectors PD1 and PD2 become reflected light amount signals S1 and S2 illustrated in FIGS. 15B and 15C. Also, a focus error signal and so forth, and other signals to be used are generated by calculation of each signal of the quartered light-receiving surfaces.

With Example 2, the multi-beam LD 41 is configured to include light-emitting surfaces of three beams only for reproduction, and also, the light-receiving element unit 46 is configured to include to photo detectors PD3 and PD5, and a quartered photo detector PD4. This is a configuration example in the case of enabling the reproduction operation described in FIGS. 8C and 19A to be performed as a reproduction apparatus, for example.

The multi-beam LD 41 irradiates three laser spots SPp1, SPp0, and SPp2 for reproduction, and also these reflected beams are detected at the photo detectors PD3, PD4, and PD5. Reflected light amount signals S1 and S2 illustrated in FIGS. 19B and 19C are obtained from the photo detectors PD3 and PD5. Also, the sum signal of the quartered light-receiving surfaces of the photo detector PD4 becomes reflected light amount signal S0. Also, a focus error signal and so forth, other signals to be used are generated by calculation of each signal of the quartered light-receiving surfaces of the photo detector PD4.

Example 3 is a configuration in the case of performing the recording operation in FIG. 6A, wherein the multi-beam LD 41 is configured to include light-emitting surfaces of two beams for reproduction, and light-emitting surfaces of two beams for recording. Correspondingly, with the light-receiving element unit 46, two photo detectors PD6 and PD7 are provided for the laser spots SPp1 and SPp2 for reproduction, and two photo detectors PD8 and PD9 are provided for the laser spots SPr1 and SPr2 for recording.

Example 4 is a configuration in the case of performing the recording operation in FIG. 8A, wherein the multi-beam LD 41 is configured to include light-emitting surfaces of three beams for reproduction. Correspondingly, with the light-receiving element unit 46, three photo detectors PD10, PD11, and PD12 are provided for the laser spots SPp1, SPp2, and SPp3 for reproduction, and three photo detectors PD13, PD14, and PD15 are provided for the laser spots SPr1, SPr2, and SPr3 for recording.

Figure 24:
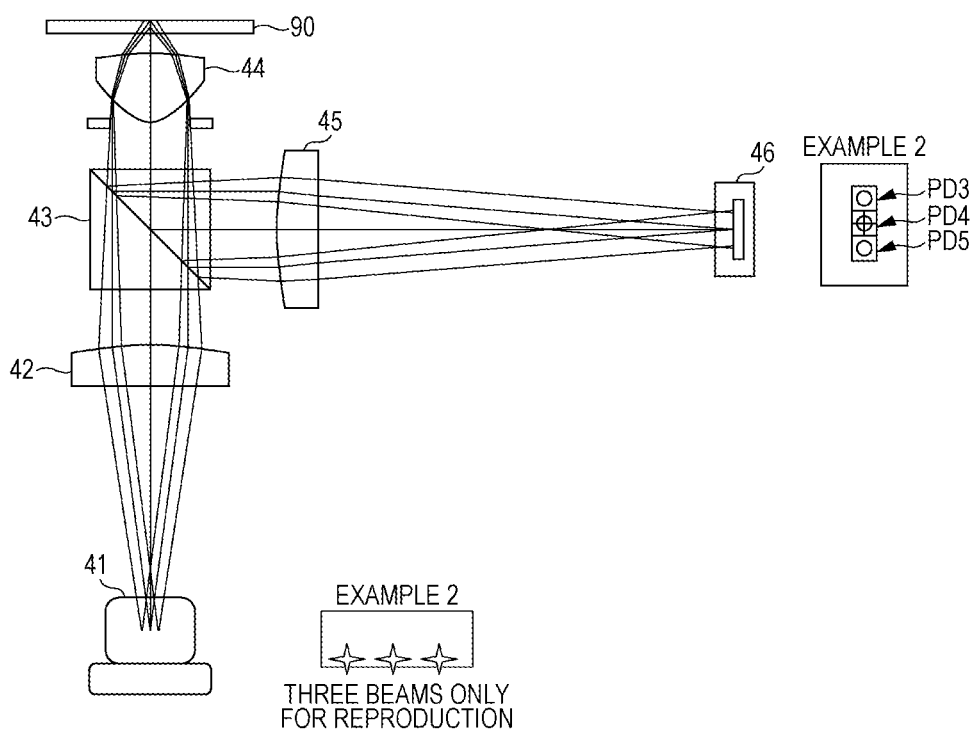
FIG. 24 is an explanatory diagram of a multi-beam flux according to the optical system configuration example in FIG. 23.

FIG. 24 illustrates a multi-beam light flux that forms three laser spots on the optical disc 90 by referencing the above Example 2, i.e., the configuration having the light-emitting surfaces of the three beams only for reproduction, and the light-receiving element unit 46 (photo detectors PD3, PD4, and PD5) corresponding thereto as an example.

As illustrated in the drawing, the three laser beams from the multi-beam LD 41 pass through the optical system made up of the collimator lens 42, beam splitter 43, and objective lens 44, and form three spots on the information recording tracks on the disc 90. These become the laser spots SPp1, SPp0, and SPp2 for reproduction described in FIGS. 8C and 19A.

Also, reflected light according to these three laser spots passes through the optical system of the objective lens 44, beam splitter 43, and multi lens 45, and input to the photo detectors PD3, PD4, and PD5 of the light-receiving element unit 46.

Though description has been made here with the case of Example 2, other Examples 1, 3, and 4 can also be conceived in the same way.

Figure 25:
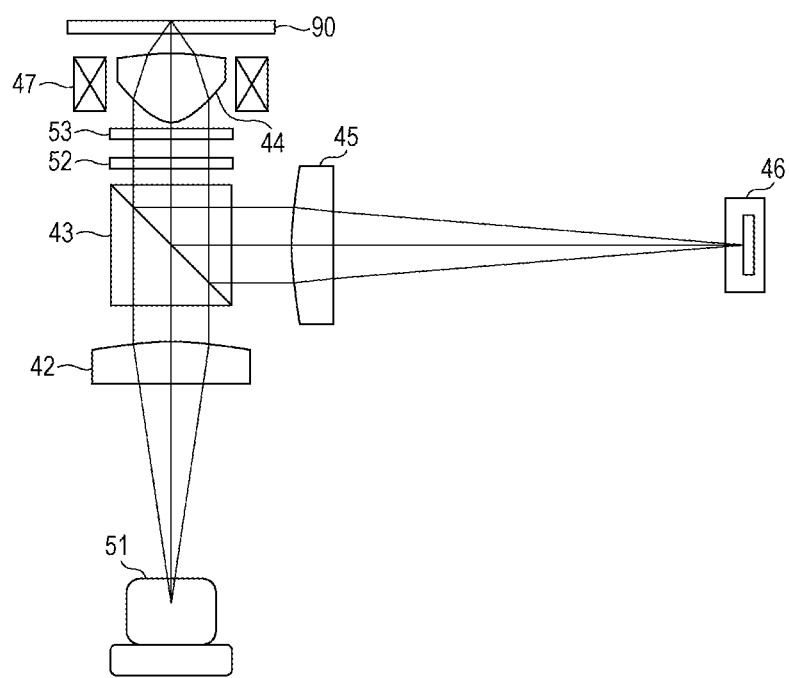
FIG. 25 is an explanatory diagram of an optical system configuration example according to an embodiment.

FIG. 25 is similarly an example in the case of employing multiple laser spots for tracking servo, but illustrates an example of the optical system for reproduction in the case of employing no multi-beam LD 41. As the optical system within the optical pickup 1, there are provided an LD 51, a collimator lens 42, a beam splitter 43, a grating 52, a QWP (quarter-wave plate) 53, an objective lens 44, a multi lens 45, a light-receiving element unit 46, and a biaxial mechanism 47.

The laser beam emitted from the multi-beam LD 41 is converted into parallel light at the collimator lens 42, passes through the beam splitter 43, and reaches the grating 52. Examples of the grating 52 include a polarization grating which diffracts only an outward journey, and a liquid crystal grating capable of on/off of diffraction.

The 3-beam optical system for reproduction can be formed by zero order light and ±1 order light obtained by the grating 52. Thus, the laser spots SPp1 and SPp2 for reproduction in FIG. 6C, or the laser spots SPp1, SPp2, and SPp3 for reproduction in FIG. 8C can be obtained.

Zero order light and ±1 order light pass through the QWP 53, and is condensed at the objective lens 44, and irradiated on the optical disc 90. The reflected light from the optical disc 90 transmits the QWP 53 and grating 52 via the objective lens 44, and is reflected at the beam splitter 43, and reaches the multi lens 45, and is condensed at the multi lens 45, and input to the light-receiving element unit 46. The light-receiving element unit 46 may be configured of photo detectors corresponding to the laser spots SPp1, SPp2, and SPp3 for reproduction according to zero order light and ±1 order light.

Note that, though this FIG. 25 illustrates the optical system for reproduction including the one-beam LD 51, an optical system capable of recording and reproduction may also be formed using a 2-beam LD, 3-beam LD, or the like.

Figure 26:
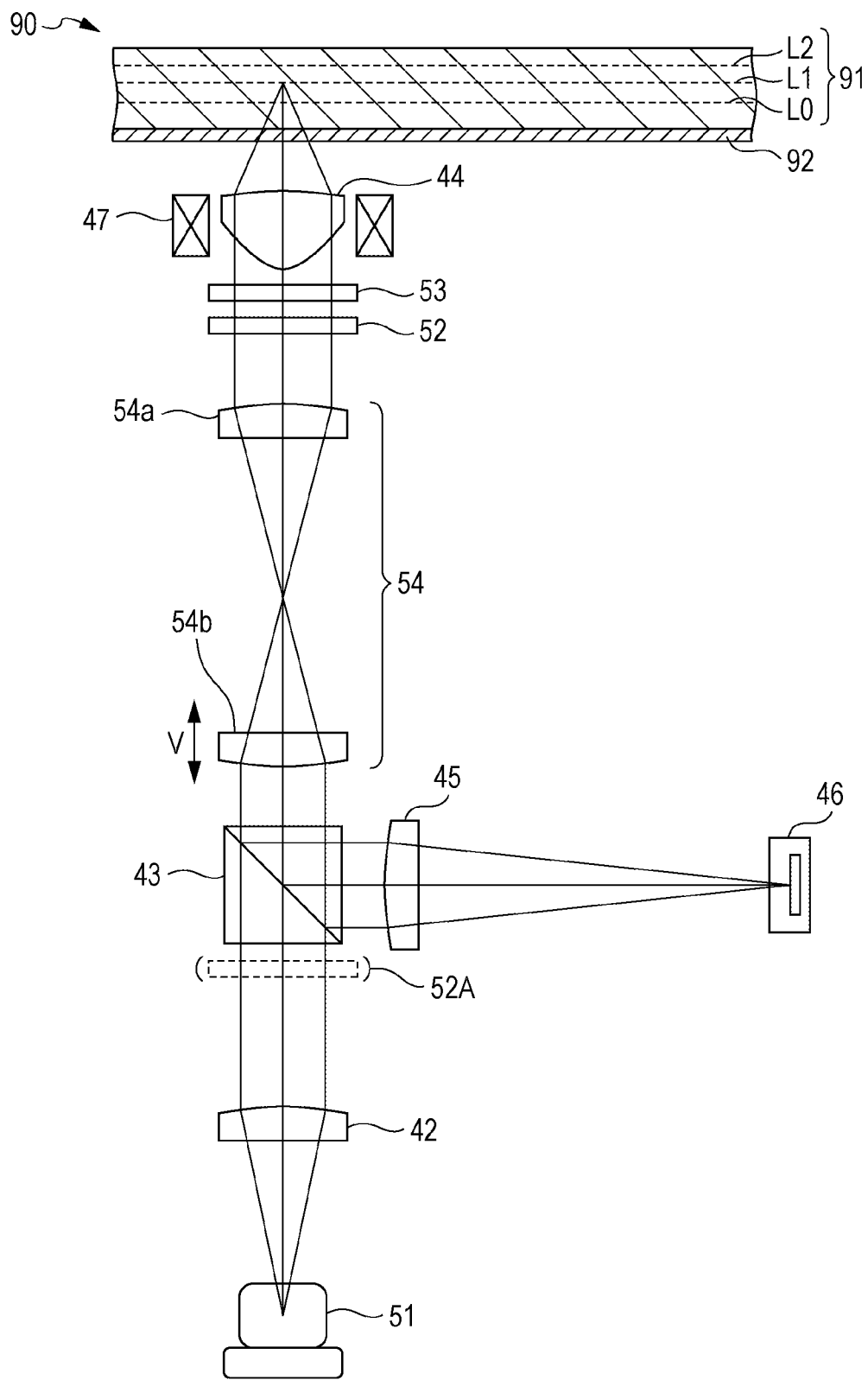
FIG. 26 is an explanatory diagram of an optical system configuration example according to an embodiment.

FIG. 26 illustrates an example of an optical system corresponding to the optical disc 90 of a multi layer such as FIG. 1B. Though this basic configuration is the same as with the example in FIG. 25, an expander lens 54 for spherical aberration correction is provided. The expander lens 54 is made up of a fixed lens 54a and a moving lens 54b. The moving lens 54b is configured so as to be displaced in an arrow V direction, i.e., the optical axial direction. An arrangement is made wherein the expander lens 54 is driven according to the layer L to be processed, and spherical aberration correction is performed.

Note that, though the grating 52 may be provided between the expander lens 54 and the QWP 53, instead of this, the grating 52 may be provided between the collimator lens 42 and the beam splitter 43 as illustrated as a dashed-line grating 52A. In the case of employing the grating 52, polarization dependency has to be had, but not in the case of employing the grating 52A.

Figure 27:
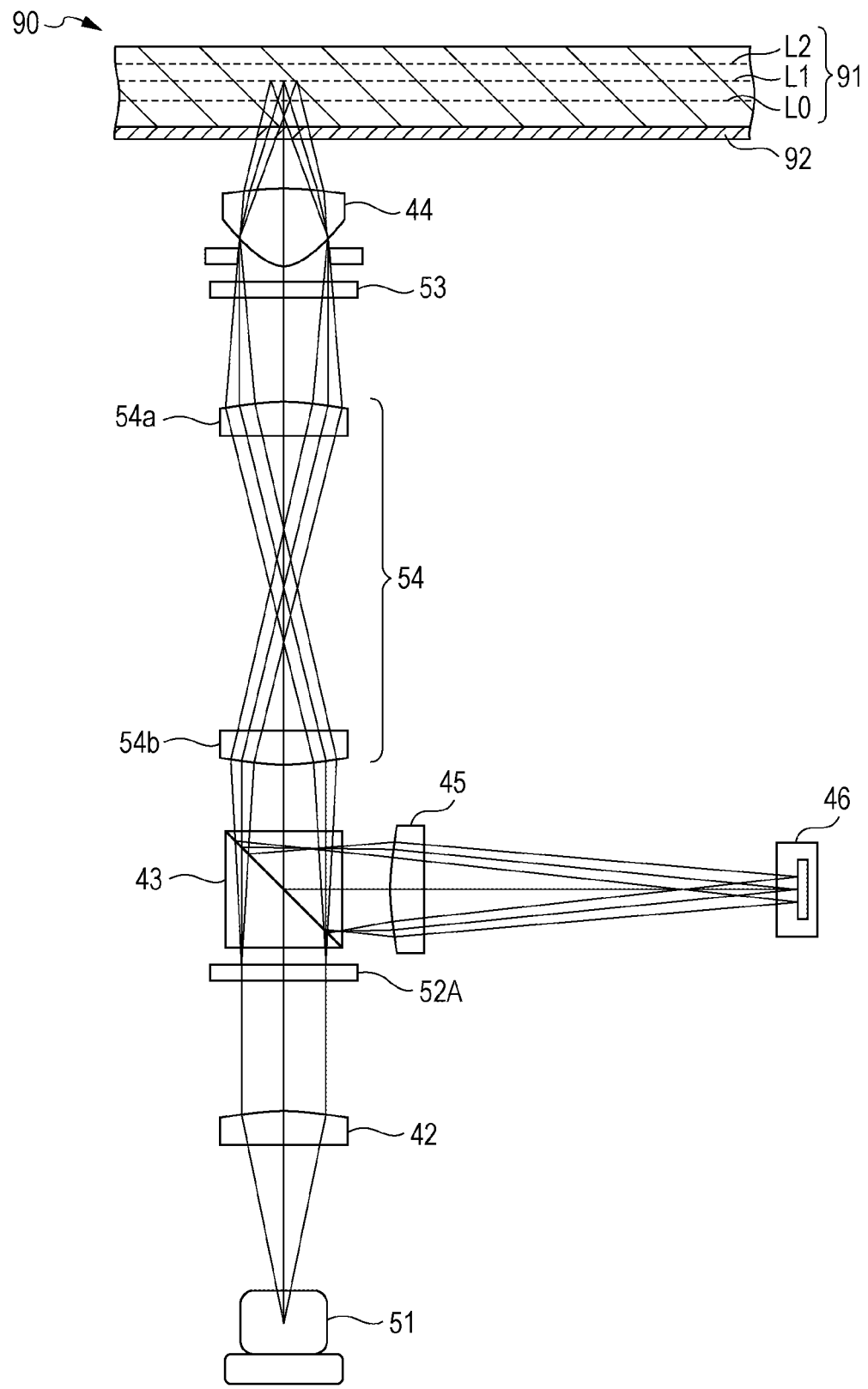
FIG. 27 is an explanatory diagram of a multi-beam flux according to the optical system configuration example in FIG. 26.

FIG. 27 illustrates, with the configuration in FIG. 26, a multi-beam light flux in the case of forming three laser spots on the optical disc 90. Here is illustrated an example employing the grating 52A.

The laser beam output from the LD 51 is converted into zero order light and ±1 order light at the grating 52A, and a multi beam forming three spots is formed. Thus, the laser spots SPp1, SPp2, and SPp3 for reproduction described in FIG. 8C can be obtained as three laser spots to be irradiated on the layer L of the disc 90.

Reflected light according to these laser spots is input to the light-receiving element unit 46 by the light flux illustrated in the drawing. Accordingly, the light-receiving element unit 46 has to be configured so as to detect reflected light, for example, using the photo detector configuration as illustrated in Example 2 in FIG. 23.

Note that, with regard to the LD 51 and light-receiving element unit 46 in the configuration in FIG. 26, a configuration example such as FIG. 23 or 25 can be conceived. Also, it can also be conceived to independently provide a laser diode for reproduction and a laser diode for recording with the examples in FIGS. 23, 25, and 26.

Figure 28:
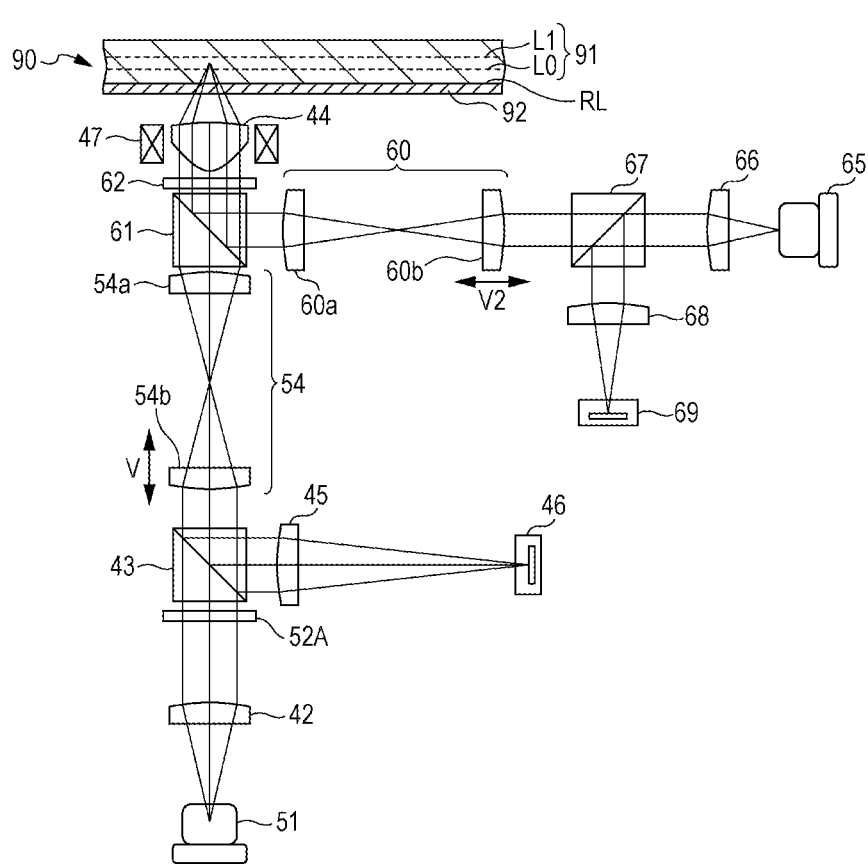
FIG. 28 is an explanatory diagram of an optical system configuration example according to an embodiment.

FIG. 28 is an optical system configuration example corresponding to the optical disc 90 to which the reference surface RL is provided such as FIG. 1C. The LD 51, collimator lens 42, grating 52A, beam splitter 43, objective lens 44, expander lens 54, multi lens 45, and light-receiving element unit 46 are the same as with FIG. 26.

In this case, an optical system is provided wherein laser beams having a different wavelength are condensed on the reference surface RL. Specifically, there are additionally provided an LD 65, a collimator lens 66, a beam splitter 67, an expander lens 60, a dichroic lens 61, and 2-wavelength QWP and wavelength selection opening restriction element 62.

The LD 65 outputs a laser beam having a wavelength different from the LD 51. Let us say that the LD 51 is, for example, a blue laser with a wavelength of 405 nm, and the LD 65 is, for example, a red laser with a wavelength of 650 nm.

The laser beam emitted from the LD 65 is converted into parallel light at the collimator lens 66, and guided into the expander lens 60 via the beam splitter 67. The expander lens 60 is made up of a fixed lens 60a and a moving lens 60b, and corrects a focal position so as to have the laser spot of a red laser beam focus on the reference surface RL.

The laser beam is then reflected at the dichroic lens 61, subjected to λ/4 polarization and opening restriction at the 2-wavelength QWP and wavelength selection opening restriction element 62, and then irradiated on the reference surface RL of the optical disc 90 via the objective lens 44.

The reflected light from the reference surface RL traces a system of the objective lens 44, 2-wavelength QWP and wavelength selection opening restriction element 62, dichroic prism 61, and expander lens 60, and is reflected at the beam splitter 67, and input to the light-receiving element unit 69 by the multi lens 68.

Note that the laser beam from the LD 51 which is a blue laser is irradiated on the layer L to be processed of the optical disc 90 via the collimator lens 66, grating 52A, beam splitter 43, expander lens 54, dichroic prism 61, 2-wavelength QWP and wavelength selection opening restriction element 62, and objective lens 44. The reflected light is then input to the light-receiving element unit 46 via a system of the objective lens 44, 2-wavelength QWP and wavelength selection opening restriction element 62, dichroic prism 61, expander lens 54, beam splitter 43, and multi lens 45. In this case, the red laser beam from the LD 65, and the blue laser beam from the LD 51 are synthesized by the dichroic prism 61, and guided into the objective lens 44.

Focusing of the objective lens 44 is controlled so that the blue laser focuses on the layer L to be processed, and in this case, in order to have the red laser focus on the reference surface RL, the moving lens 60b of the expander lens 60 is adjusted in an optical axial direction V2. With regard to the red laser beam, according to adjustment by the expander lens 54, and opening restriction by the 2-wavelength QWP and wavelength selection opening restriction element 62, a laser spot thereof is consequently focused on the reference surface RL.

In the case of employing such an optical system, information such as a group formed on the reference surface RL, and so forth can be obtained from the reflected light information obtained at the light-receiving element unit 69. Accordingly, the tracking servo operation of the objective lens 44 is executed by taking this information as tracking guide information, whereby recording or reproduction as to the layer L using the blue laser can be executed.

Note that, with the configuration in FIG. 28, it can also be conceived to employ the multi-beam LD 41 instead of the LD 51, or to independently provide a laser diode for reproduction, and a laser diode for recording.

Figure 29A:
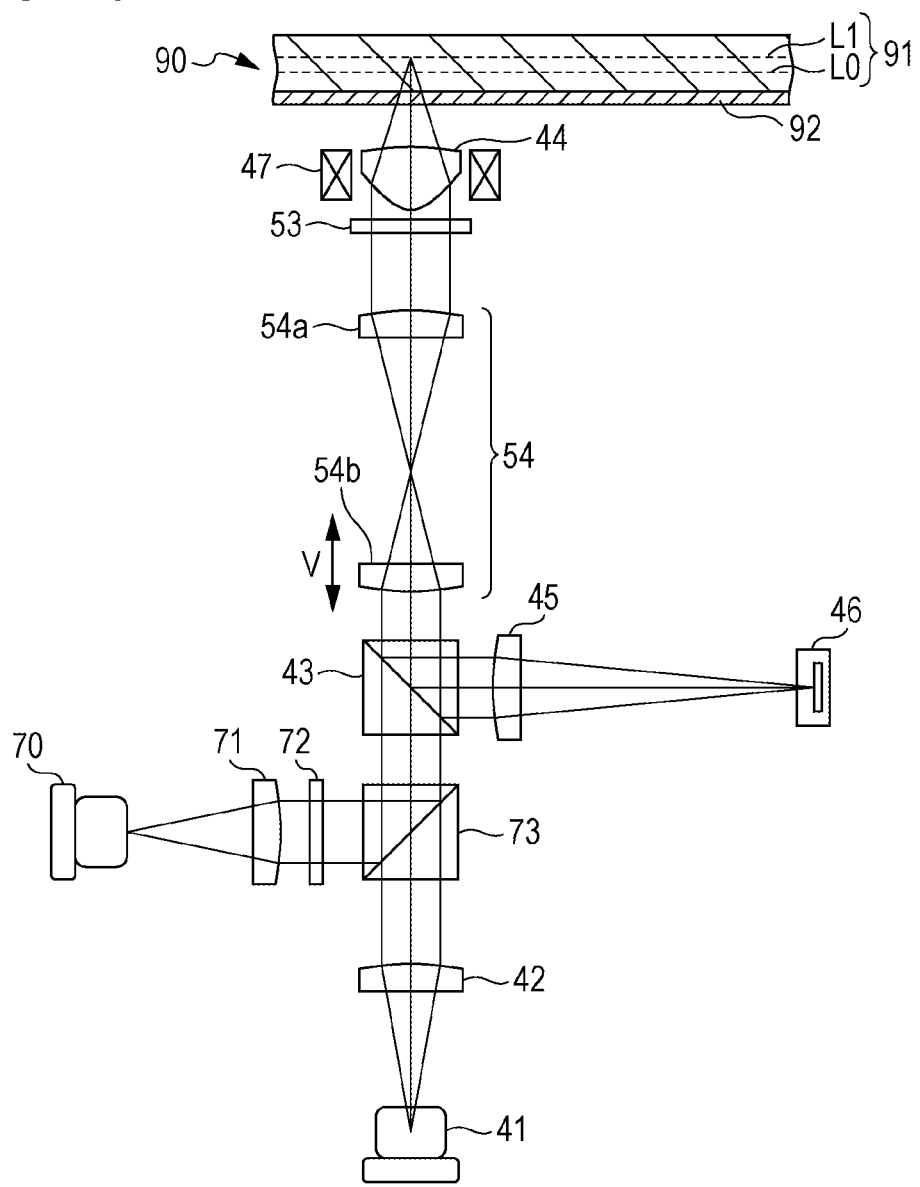
FIGS. 29A and 29B are explanatory diagrams of an optical system configuration example according to an embodiment.

Next, FIG. 29A is a configuration example of an optical system in the case of employing the laser spot SPp45 for servo to which astigmatism has been applied as described in FIGS. 7A through 7D.

As an optical system for irradiating the laser spots SPp1 and SPp2 for reproduction, there are provided the multi-beam LD 41, collimator lens 42, beam splitter 43, expander lens 54, QWP 53, and objective lens 44. Also, the multi lens 45 and light-receiving element unit 46 for receiving reflected light are provided.

In addition to these, in order to irradiate the laser spot SPp45 for servo, there are provided an LD 70, a collimator lens 71, a 45-degree astigmatism beam diffraction element 72, and an optical-path synthesizing prism 73.

The laser beam from the multi-beam LD 41 is irradiated on the layer L to be processed of the optical disc 90 via the collimator lens 42, optical path synthesizing prism 73, beam splitter 43, expander lens 54, QWP 53, and objective lens 44. The reflected light thereof is input to the light-receiving element unit 46 via the system of the objective lens 44, QWP 53, expander lens 54, beam splitter 43, and multi lens 45.

On the other hand, the laser beam from the LD 70 is converted into parallel light at the collimator lens 71, and then input to the 45-degree astigmatism beam diffraction element 72.

Figure 29B:
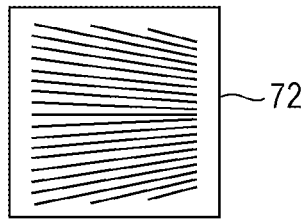

The 45-degree astigmatism beam diffraction element 72 is, as illustrated in FIG. 29B, configured of a hologram pattern that causes astigmatism, and applies astigmatism with mutually reversed polarities, and also a generally 45-degree angle as to the tangential direction of the information recording track formed on the layer L of the optical disc 90 to a pair of sub luminous fluxes (±1 order light).

The laser spot SPp45 for servo described in FIGS. 7A through 7D and so forth is a laser spot having 45-degree astigmatism. Therefore, it is desirable that the +1 order light or −1 order light obtained from the 45-degree astigmatism beam diffraction element 72 is employed as a laser beam forming the laser spot SPp45 for servo. Note that an arrangement may be made wherein astigmatism is applied not by a diffraction element according to a hologram pattern but by a liquid crystal element.

The laser beam for forming the laser spot SPp45 for servo, from the 45-degree astigmatism beam diffraction element 72 is synthesized with the laser beam from the LD 70 (laser beam for forming the laser spots SPp1 and SPp2 for reproduction) at the optical-path synthesizing prism 73, and is irradiated on the optical disc 90 using the same route. Also, the reflected light of the laser spot SPp45 for servo is guided into the light-receiving element unit 46 using the same routes as with the laser spots SPp1 and SPp2 for reproduction.

For example, according to tracking servo control taking a tangential push pull signal obtained from the reflected light information of the laser spot SPp45 for servo to which astigmatism having generally 45-degree angle has been applied by using such an optical system, as a tracking error signal, and using this tracking error signal, data can be reproduced form the reflected light information by the laser spots SPp1 and SPp2 for reproduction being on-track-controlled as to the information recording track.

Note that, with the configuration in FIG. 29, a recording power laser beam is emitted from the multi beam LD 41 (or LD 51 instead of this), whereby a recording operation such as FIGS. 7A and 7B can be performed. It goes without saying that it can also be conceived to independently provide a laser diode for reproduction, and a laser diode for recording.

7. Modifications

While the embodiment has been described so far, the technique of the present disclosure is not restricted to the examples in the embodiment, and various modifications can be conceived. While the information recording tracks of the optical disc 90 are configured so as to have a multi-spiral configuration such as a double spiral configuration, a triple spiral configuration, or the like, the information recording tracks may have a configuration according to concentric circular tracks.

Specifically, as for concentric circular tracks, an arrangement may be made wherein multiple track groups adjacent with the track pitch Tp1 are formed, and also, the track groups are separated by the track pitch Tp2. Thus, the information recording tracks as illustrated in FIGS. 2A, 3A, and 4A may be formed.

Also, in the case of the multi-spiral configuration, a relation between the number of spirals and the number of tracks separated with the track pitch Tp1 within a track group is not necessarily the same number.

For example, FIGS. 2A, 2B, 3A, 3B, 4A, and 4B exemplify a case of a double spiral configuration where two tracks make up a track group, a case of a triple spiral configuration where three tracks make up a track group, and a case of a quadruple spiral configuration where four tracks make up a track group, respectively. However, an example illustrated in FIGS. 30A and 30B can also be assumed.

With the configuration illustrated in FIG. 30A, a quadruple spiral configuration is employed as track paths TKa, TKb, TKc, and TKd.

As illustrated in FIG. 30B in a partial enlarged manner, a track pitch of the tracks of the track paths TKa and TKb is Tp1, and also a track pitch of the tracks of the track paths TKc and TKd is similarly Tp1. On the other hand, a track pitch of the tracks of the track paths TKb and TKc is Tp2.

That is to say, in this case, "a track group of multiple tracks being adjacent with the track pitch Tp1 narrower than a track pitch equivalent to optical cut-off" becomes a set of the tracks of the track paths TKa and TKb, or a set of the tracks of the track paths TKc and TKd. Accordingly, the track group pitch TpG becomes a pitch between the track group of the track paths TKa and TKb, and the track group of the track paths TKc and TKd.

Though this example is a quadruple spiral configuration, this example is an example wherein every two tracks make up a track group, and this has the same information track configuration as with FIG. 2A as viewed in the disc radial direction.

In this way, an example can be conceived wherein the tracks of the number of multiple spirals are all not taken as a track group separated with the track pitch Tp1. In other words, as described above, a relation between the number of spirals, and the number of tracks separated with the track pitch Tp1 within a track group may not be the same number.

Similarly, there is also an example wherein, with a sixfold spiral, two track groups are formed of three tracks with the tack pitch Tp1, or three track groups are formed of two tracks with the tack pitch Tp1.

Also, track pitches within a track group are not restricted to being constant. For example, in FIGS. 4A and 4B, four tracks make up a track group, the tracks within the track group are each separated with the track pitch Tp1.

For example, with TK1, TK2, TK3, and TK4, any of between the tracks TK1 and TK2, between the tracks TK2 and TK3, and between the tracks TK3 and TK4 has the track pitch Tp1. Here, the track pitches between the tracks TK1 and TK2, between the tracks TK2 and TK3, and between the tracks TK3 and TK4 may not necessarily be the same.

An example of this is a case where between the tracks TK1 and TK2 is 0.15 μm, between the tracks TK2 and TK3 is 0.20 μm, and between the tracks TK3 and TK4 is 0.15 μm.

Figure 31A:
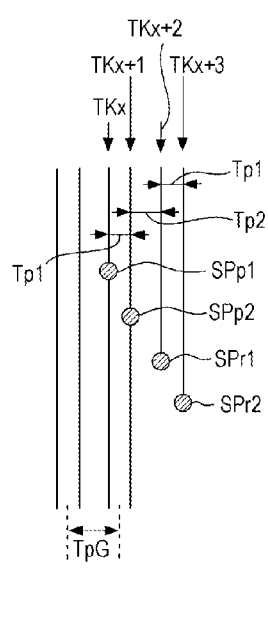
FIGS. 31A through 31C are explanatory diagrams of a modification of a laser spot irradiation location relation according to an embodiment.
Figure 31B:
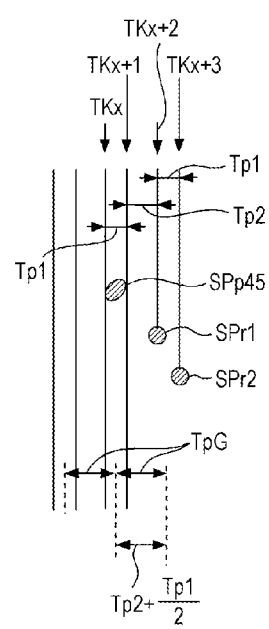
Figure 31C:
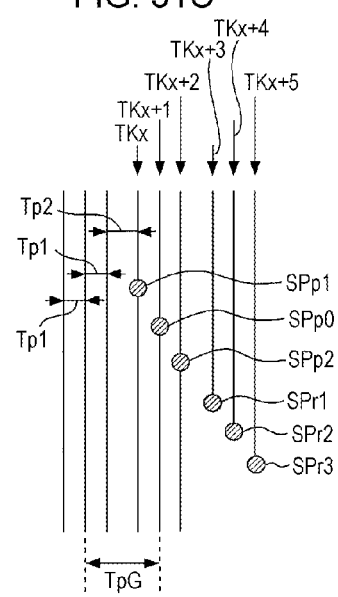

Also, a layout of laser spot irradiation positions described in FIGS. 6A, 7A, and 8A can variously be conceived. Examples are illustrated in FIGS. 31A through 31C. FIG. 31A is a modification of FIG. 6A, FIG. 31B is a modification of FIG. 7A, and FIG. 31C is a modification of FIG. 8A.

The state in FIG. 6A is a state in which the laser spots SPp1 and SPp2 for reproduction used for servo precedes the laser spots SPr1 and SPr2 for recording in the tack line direction. This may be in a state in which the laser spots SPr1 and SPr2 for recording precedes the laser spots SPp1 and SPp2 for reproduction used for servo, as illustrated in FIG. 31A.

In FIG. 7A, the laser spot SPp45 for servo precedes the laser spots SPr1 and SPr2 for recording, but as illustrated in FIG. 31B, there may be a state in which the laser spots SPr1 and SPr2 for recording precedes the laser spot SPp45 for servo in the track line direction.

While the state in FIG. 8A is a state in which the laser spots SPp1, SPp0, and SPp2 for reproduction used for servo precedes the laser spots SPr1, SPr2, and SPr3 for recording in the tack line direction, this may be in a state in which the laser spots SPr1, SPr2, and SPr3 for recording precedes the laser spots SPp1, SPp0, and SPp2 for reproduction used for servo, as illustrated in FIG. 31C.

Also, though the optical disc has been referenced as an example of a recording medium, the recording medium is not restricted to a disc-shaped recording medium. For example, the track configurations and tracking servo systems referenced in the embodiment can be applied to a card-shaped recording medium such an optical card or the like.

The technique of the present disclosure can also employ the following arrangements.

(1) A reproducing method including: irradiating a laser spot for servo to which astigmatism making up an angle of generally 45 degrees as to the tangential direction of an information recording track has been applied, and one or more laser spots for reproduction to a recording medium where a track group is formed with multiple information recording tracks being adjacent with a first track pitch narrower than a track pitch equivalent to optical cut-off stipulated by the wavelength of a laser beam to be irradiated, and NA of an irradiation optical system, and also the adjacent track groups are formed so as to be separated with a second track pitch wider than the track pitch equivalent to optical cut-off; and subjecting at least one or more laser spots for reproduction to on-track control as to one of the information recording tracks by taking a tangential push pull signal obtained from reflected light information of the laser spot for servo as a tracking error signal, and performing tracking servo control using this tracking error signal, and reproducing data from the reflected light information thereof.

(2) The reproducing method according to the above (1), further including: irradiating n laser spots for reproduction corresponding to a number n of tracks within the track group, and also performing tracking servo control so as to have the n laser spots for reproduction on-track as to each information recording track within the track group; and reproducing information of each track from the reflected light information of each irradiated laser spot for reproduction.

(3) The reproducing method according to the above (1) or (2), further including: irradiating n laser spots for reproduction corresponding to a number n of tracks within the track group so that the information recording tracks of the recording medium have a multi-spiral configuration where n independent track paths are each formed in a spiral shape, the track group of the first track pitch is formed of the n track paths, and between the track groups which are revolved with the multi-spiral configuration and adjacent is arranged to be the second track pitch.

(4) The reproducing method according to any of the above (1) through (3), further including: reproducing data after performing crosstalk cancel processing regarding the reflected light information of a laser spot for reproduction on-track-controlled as to an information recording track.

The present application contains subject matter related to that disclosed in Japanese Priority Patent Application JP 2011-113544 filed in the Japan Patent Office on May 20, 2011, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A reproducing method comprising:

irradiating a laser spot for servo to which astigmatism making up an angle of generally 45 degrees as to the tangential direction of an information recording track has been applied, and one or more laser spots for reproduction, onto a recording medium where a track group is formed with a plurality of information recording tracks being adjacent with a narrower track pitch than a track pitch equivalent to optical cut-off stipulated by the wavelength of a laser beam to be irradiated, and by the NA (numerical aperture) of an irradiation optical system, and also where a track group pitch from a perspective of the track group unit is arranged to be wider than said track pitch equivalent to optical cut-off; and subjecting at least one or more laser spots for reproduction to on-track control as to one of said information recording tracks by taking a tangential push pull signal obtained from reflected light information of said laser spot for servo as a tracking error signal, and performing tracking servo control using this tracking error signal, and reproducing data from the reflected light information thereof.

2. The reproducing method according to claim 1, further comprising:

irradiating n laser spots for reproduction corresponding to a number n of tracks within said track group, and also performing tracking servo control so as to have the n laser spots for reproduction on-track as to each information recording track within said track group; and reproducing information of each track from the reflected light information of each irradiated laser spot for reproduction.

3. The reproducing method according to claim 2, further comprising:

irradiating n laser spots for reproduction corresponding to a number n of tracks within said track group so that said information recording tracks of said recording medium have a multi-spiral configuration where n independent track paths are each formed in a spiral shape, said track group is formed of said n track paths, and said track group pitch of said track groups which are revolved with the multi-spiral configuration and adjacent is arranged to be wider than a track pitch equivalent to said optical cut-off.

4. The reproducing method according to claim 1, further comprising:

reproducing data after performing crosstalk cancel processing regarding the reflected light information of a laser spot for reproduction on-track-controlled as to an information recording track.

5. A reproducing apparatus comprising:

an optical head configured to irradiate a laser spot for servo to which astigmatism making up an angle of generally 45 degrees as to the tangential direction of an information recording track has been applied, and one or more laser spots for reproduction, onto a recording medium where a track group is formed with a plurality of information recording tracks being adjacent with a narrower track pitch than a track pitch equivalent to optical cut-off stipulated by the wavelength of a laser beam to be irradiated, and NA of an irradiation optical system, and also where a track group pitch from a perspective of the track group unit is arranged to be wider than said track pitch equivalent to optical cut-off, via an objective lens to obtain reflected light information according to each laser spot;

a servo circuit unit configured to cause said optical head to execute a tracking operation for having at least one or more laser spots for reproduction on-track as to one of said information recording tracks by taking a tangential push pull signal obtained from reflected light information of said laser spot for servo as a tracking error signal, and performing tracking servo control using this tracking error signal; and a reproducing circuit unit configured to reproduce data from the reflected light information of a laser spot for reproduction on-track-controlled as to an information recording track.

6. The reproducing apparatus according to claim 5, further comprising:

a crosstalk cancel unit configured to perform crosstalk cancel processing regarding the reflected light information of a laser spot for reproduction on-track-controlled as to an information recording track;

wherein said reproducing circuit unit reproduces data from reflected light information subjected to crosstalk cancel processing at said crosstalk cancel unit.

* * * * *